US009804288B2

(12) United States Patent
Estes et al.

(10) Patent No.: US 9,804,288 B2
(45) Date of Patent: Oct. 31, 2017

(54) REAL-TIME, LIMITED ORIENTATION SENSOR AUTO-CALIBRATION

(71) Applicants: Robert A. Estes, Tomball, TX (US); Randy R. Riggs, Cut-N-Shoot, TX (US); Francis Chad Hanak, League City, TX (US); John F. Priest, Tomball, TX (US)

(72) Inventors: Robert A. Estes, Tomball, TX (US); Randy R. Riggs, Cut-N-Shoot, TX (US); Francis Chad Hanak, League City, TX (US); John F. Priest, Tomball, TX (US)

(73) Assignee: BAKER HUGHES, a GE COMPANY, LLC, Houston, TX (US)

( * ) Notice: Subject to any disclaimer, the term of this patent is extended or adjusted under 35 U.S.C. 154(b) by 685 days.

(21) Appl. No.: 14/280,309

(22) Filed: May 16, 2014

(65) Prior Publication Data

US 2015/0331138 A1 Nov. 19, 2015

(51) Int. Cl.
*G01V 3/26* (2006.01)
*G01V 7/00* (2006.01)
(Continued)

(52) U.S. Cl.
CPC ............ *G01V 3/26* (2013.01); *E21B 47/0905* (2013.01); *G01V 7/005* (2013.01); *G01V 7/04* (2013.01);
(Continued)

(58) Field of Classification Search
CPC .......... G01V 3/26; G01V 7/005; G01V 11/00; G01V 3/40; G01V 7/04; G01V 13/00; G01V 7/00; E21B 47/0905
(Continued)

(56) References Cited

U.S. PATENT DOCUMENTS 4,542,647 A 9/1985 Molnar
5,321,893 A * 6/1994 Engebretson ......... E21B 47/022
33/304
(Continued)

OTHER PUBLICATIONS

Elgizawy, Mohmoud et al.; "Wellbore Surveying While Drilling Based on Kalman Filtering," American J. of Engineering and Applied Sciences 3 (2), 2010, pp. 240-259.
(Continued)

*Primary Examiner* — Carol S Tsai
(74) *Attorney, Agent, or Firm* — Cantor Colburn LLP

(57) ABSTRACT

A system method and computer-readable medium for correcting measurements obtained by a down hole tool for residual measurement errors is disclosed. A down hole tool having at least two directional field sensors is disposed in a borehole. The at least two directional sensors are substantially orthogonal to each other and to a longitudinal axis of the down hole tool. Measurements are obtained from the at least two directional sensors during rotation of the tool by at least 360 degrees around the longitudinal axis of the tool. Residual measurement errors are determined for the obtained measurements, and a quality level of the determined residual measurement errors selected. The determined residual measurement errors are applied to the obtained measurements when the determined residual measurement errors are consistent with the selected quality level. In various embodiments, the residual measurement errors are reduced from a first value that does not match the selected quality level to a second value that are consistent with the selected quality level.

24 Claims, 10 Drawing Sheets

(51) Int. Cl.
*G01V 7/04* (2006.01)
*G01V 11/00* (2006.01)
*G01V 13/00* (2006.01)
*E21B 47/09* (2012.01)
*G01V 3/40* (2006.01)

(52) U.S. Cl.
CPC .............. *G01V 11/00* (2013.01); *G01V 13/00* (2013.01); *G01V 3/40* (2013.01); *G01V 7/00* (2013.01)

(58) Field of Classification Search
USPC ................................................. 702/9, 10, 92
See application file for complete search history.

(56) References Cited

U.S. PATENT DOCUMENTS

| | | |
|---|---|---|
| 5,397,893 A | 3/1995 | Minette |
| 5,513,528 A | 5/1996 | Holenka et al. |
| 5,899,958 A | 5/1999 | Dowell et al. |
| 6,227,310 B1 | 5/2001 | Jamieson |
| 6,359,438 B1 | 3/2002 | Bittar |
| 6,529,834 B1 | 3/2003 | Estes et al. |
| 6,584,837 B2 | 7/2003 | Kurkoski |
| 6,637,524 B2 | 10/2003 | Kruspe et al. |
| 6,816,788 B2 | 11/2004 | Van Steenwyk et al. |
| 6,859,727 B2 | 2/2005 | Bye et al. |
| 6,882,937 B2 | 4/2005 | McElhinney |
| 6,966,211 B2 | 11/2005 | Wu |
| 7,000,700 B2 | 2/2006 | Cairns et al. |
| 7,080,460 B2 | 7/2006 | Illfelder |
| 7,114,565 B2 | 10/2006 | Estes et al. |
| 7,195,062 B2 | 3/2007 | Cairns et al. |
| 7,252,144 B2 | 8/2007 | Estes et al. |
| 7,650,269 B2 | 1/2010 | Rodney |
| 7,962,287 B2 | 6/2011 | Clark |
| 8,374,817 B2 | 2/2013 | Boeve et al. |
| 8,473,211 B2 | 6/2013 | Cheung |
| 8,531,180 B2 | 9/2013 | Piemonte et al. |
| 2003/0158699 A1 | 8/2003 | Townsend et al. |
| 2004/0061777 A1* | 4/2004 | Sadok .................. G08B 17/125 348/83 |
| 2012/0245875 A1 | 9/2012 | del Castillo et al. |
| 2013/0151158 A1* | 6/2013 | Brooks ................. E21B 47/022 702/9 |
| 2015/0035536 A1* | 2/2015 | Tang ........................ G01V 3/20 324/339 |

OTHER PUBLICATIONS

Kok, Manon et al.; "Calibration of a magnetometer in combination with inertial sensors," Proceedings of the 15th International Conference on Information Fusion (FUSION), 2012, pp. 787-793.

Pang, Hongfeng et aol.; "Calibration of three-axis magnetometers with differential evolution algorithm," Journal of Magnetism and Magnet Materials 346, 2013, pp. 5-10.

\* cited by examiner

REAL-TIME, LIMITED ORIENTATION SENSOR AUTO-CALIBRATION

BACKGROUND OF THE DISCLOSURE

1. Field of the Disclosure

The present disclosure is related to magnetic measurements obtained in a borehole and, in particular, to determining a residual measurement error in measurements obtained using a magnetometer or an accelerometer in a borehole.

2. Description of the Related Art

Petroleum exploration generally includes conveying sensors into the well bore for characterizing the down hole formations. The sensor data is used to create various logs recording the properties of the formation. These logs may be obtained either using a measurement-while-drilling process (MWD) a measurement-after-drilling (MAD) process in which sensors are conveyed on the drill string, or using an after drilling process in which sensors are lowered into the wellbore on cable, pipe strings or tubing (these last three are generally described by wireline to differentiate from MWD and MAD). Sensors such as accelerometers and magnetometers are usually included in the suite of sensors, and are generally used for determining the position of the sensors within the wellbore regardless of the conveyance method. These accelerometers and magnetometers sensors contain measurement errors that are intrinsic to the sensor itself, and in the case of magnetometer may be due magnetic sources within the conveyance system, including sensor housings. Although accelerometer and magnetometer measurements are useful, and in many cases necessary, for logging operations, each accelerometer and magnetometer includes various measurement errors that affect its measurements. These errors may be due, for example, to bias (or offset), misalignment, different axial locations and different sensitivities of the accelerometer and magnetometer components. Therefore, there is a need to reduce measurement errors in the down hole sensors measurements, such as magnetometer and accelerometer measurements.

Accelerometers and magnetometers are also used to detect both gravity and magnetic anomalies. Given that locally, the gravity and magnetic fields are virtually constant, these anomalies are generally defined as inclinations from a standard field model, e.g. gravity and WGS 84 gravity model, and the International geomagnetic field model, IGRF, from the United States Geological Survey. Gravity anomalies are generally below the threshold sensitivity of the usual accelerometers used in typical logging system. However, some magnetic anomalies are within the range of sensitivity of the typical magnetometers and if uncorrected generally degrade the magnetometer data. Various formation logs may include accelerometer and magnetic measurements within the formation to determine the formation location within the sub-surface. The magnetometers can detect magnetically anomalous features that may indicate the presence of nearby magnetic material, e.g. a casing, debris in the well, or large scale paleomagnetic effects, e.g. remnant magnetic field in volcanics.

SUMMARY OF THE DISCLOSURE

In one aspect, the present disclosure provides a method of correcting measurements obtained by a down hole tool for residual measurement errors. The method includes: disposing the tool having at least three each directional field sensor sets in a borehole, the first set contains accelerometers and the second magnetometers, wherein the at least three accelerometer and magnetometer directional sensors are substantially orthogonal to each other, within each set and, preferentially, one axis of each set is parallel to longitudinal axis of the down hole tool, and each axis of each set is substantially parallel to a corresponding axis in the other set; obtaining measurements from the at least two sets of directional sensors throughout the logging run. This configuration provides a common tri-axial system for each sensor set, or a full sensor set. From the measurement data, the sensor biases and the local tool magnetic field may be determined by a non-linear inversion method and used to correct accelerometer and magnetometer sensor data.

In another aspect, from the corrected sensor measurements, with the known values of the local Earth magnetic field vector, the non-linear inversion method extracts the magnetic anomaly field vector at each measurement position. The extracted magnetic anomaly data is recorded to the output system, and the anomaly data is removed from the magnetic data, and this resulting output data provides the input for additional processed outputs, e.g. well inclination and well azimuth. Given the corrected orientation outputs, the magnetic anomaly vectors can then be transformed into the local Earth coordinate system. From the magnetic anomaly data, the magnitude and direction of the magnetic anomaly is computed and output for further log processing.

In yet another aspect, the present disclosure provides a method of correcting magnetic measurements obtained by a down hole tool for residual measurement errors in a reduced sensor configuration. The method includes: disposing the tool having at least two directional field sensors in a borehole, wherein the at least two directional sensors are substantially orthogonal to each other and to a longitudinal axis of the down hole tool; obtaining measurements from the at least two directional sensors during rotation of the tool by at least 360 degrees around the longitudinal axis of the tool; determining residual measurement errors for the obtained measurements; selecting a quality level of the determined residual measurement errors; and applying the determined residual measurement errors to the obtained measurements when the determined residual measurement errors are consistent with the selected quality level.

In yet another aspect, the present disclosure provides a computer-readable medium having a set of instruction stored therein that are accessible to a processor in order to enable the processor to perform a method, the method of processing the full sensor set, the reduced sensor set and/or the magnetic anomaly extraction.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description, taken in conjunction with the accompanying drawings, in which like elements have been given like numerals and wherein.

DETAILED DESCRIPTION OF THE DISCLOSURE

Figure 1:
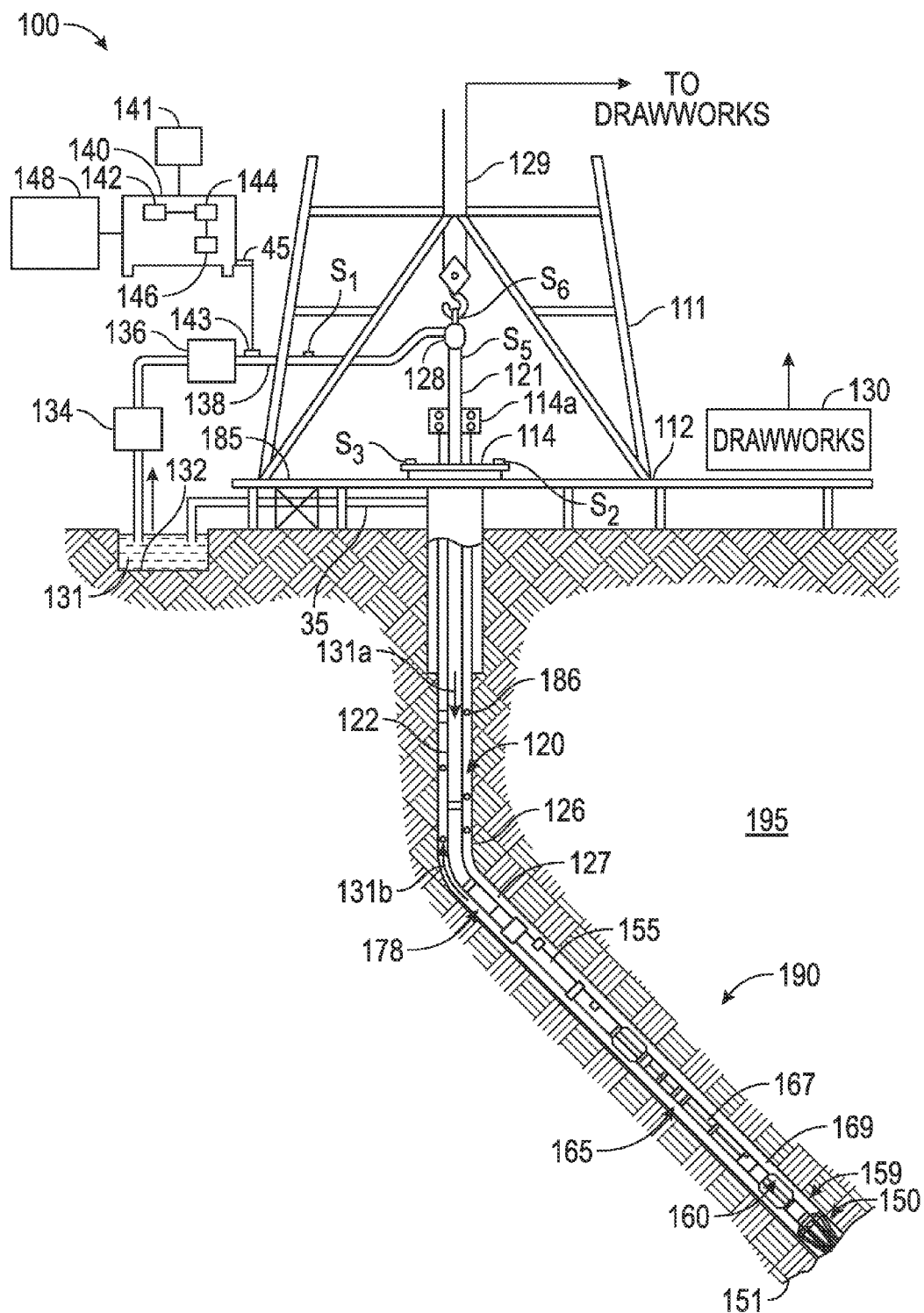
FIG. 1 is a schematic diagram of an exemplary drilling system 100 that includes a drill string having a drilling assembly attached to its bottom end that includes a suite of logging instruments (logging string) that house accelerometers and magnetometers for making acceleration and magnetic field measurements according to one embodiment of the disclosure.

FIG. 1 is a schematic diagram of an exemplary drilling system 100 that includes a drill string having a drilling assembly attached to its bottom end that includes a magnetometer and accelerometer for making various formation measurements according to one embodiment of the disclosure. FIG. 1 shows a drill string 120 that includes a drilling assembly or bottom hole assembly ("BHA") 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190 attached at its bottom end, extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. The operation of the drawworks 130 is known in the art and is thus not described in detail herein.

In an aspect, a suitable drilling fluid 131 (also referred to as "mud") from a source 132 thereof, such as a mud pit, is circulated under pressure through the drill string 120 by a mud pump 134. The drilling fluid 131 passes from the mud pump 134 into the drill string 120 via a de-surger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 provide information about the torque and the rotational speed of the drill string 120. Rate of penetration of the drill string 120 may be determined from the sensor $S_5$, while the sensor $S_6$ may provide the hook load of the drill string 120.

In some applications, the drill bit 150 is rotated by rotating the drill pipe 122. However, in other applications, a down hole motor 155 (mud motor) disposed in the drilling assembly 190 also rotates the drill bit 150. The rate of penetration ("ROP") for a given drill bit and BHA largely depends on the WOB or the thrust force on the drill bit 150 and its rotational speed.

A surface control unit or controller 140 receives signals from the down hole sensors and devices via a sensor 143 placed in the fluid line 138 and signals from sensors $S_1$-$S_6$ and other sensors used in the system 100 and processes such signals according to programmed instructions provided from a program to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc or other non-transitory storage medium, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from down hole and may control one or more operations of the down hole and surface devices.

Figure 2:
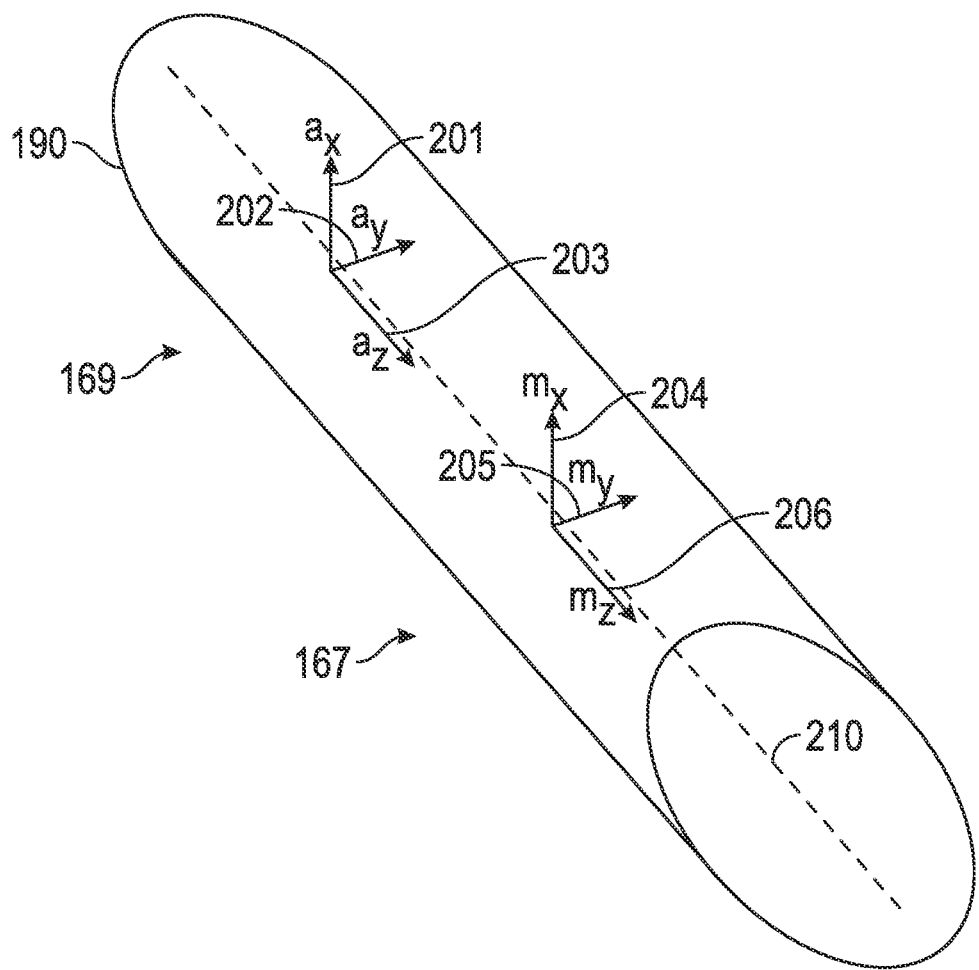
FIG. 2 shows a schematic illustration of an exemplary wireline logging system having attached to its bottom end a suite of logging instruments (logging string) that house accelerometers and magnetometers for making acceleration and magnetic field measurements according to one embodiment of the disclosure.

The drilling assembly 190 also contain formation evaluation sensors or devices (also referred to as measurement-while-drilling, "MWD," or logging-while-drilling, "LWD," sensors) determining resistivity, density, porosity, permeability, acoustic properties, nuclear-magnetic resonance properties, corrosive properties of the fluids or formation down hole, salt or saline content, and other selected properties of the formation 195 surrounding the drilling assembly 190. Such sensors are generally known in the art and for convenience are generally denoted herein by numeral 165. The drilling assembly 190 may further include a variety of other sensors and communication devices 159 for controlling and/or determining one or more functions and properties of the drilling assembly (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc. The BHA 190 may further include various survey instruments determining a location and orientation of the drill string 120 in the borehole 126. In various embodiments, these instruments may include a magnetometer 167 and an accelerometer 169, such as shown in FIG. 2. A wireline system for performing logging measurements is discussed below with respect to FIG. 9.

Figure 9:
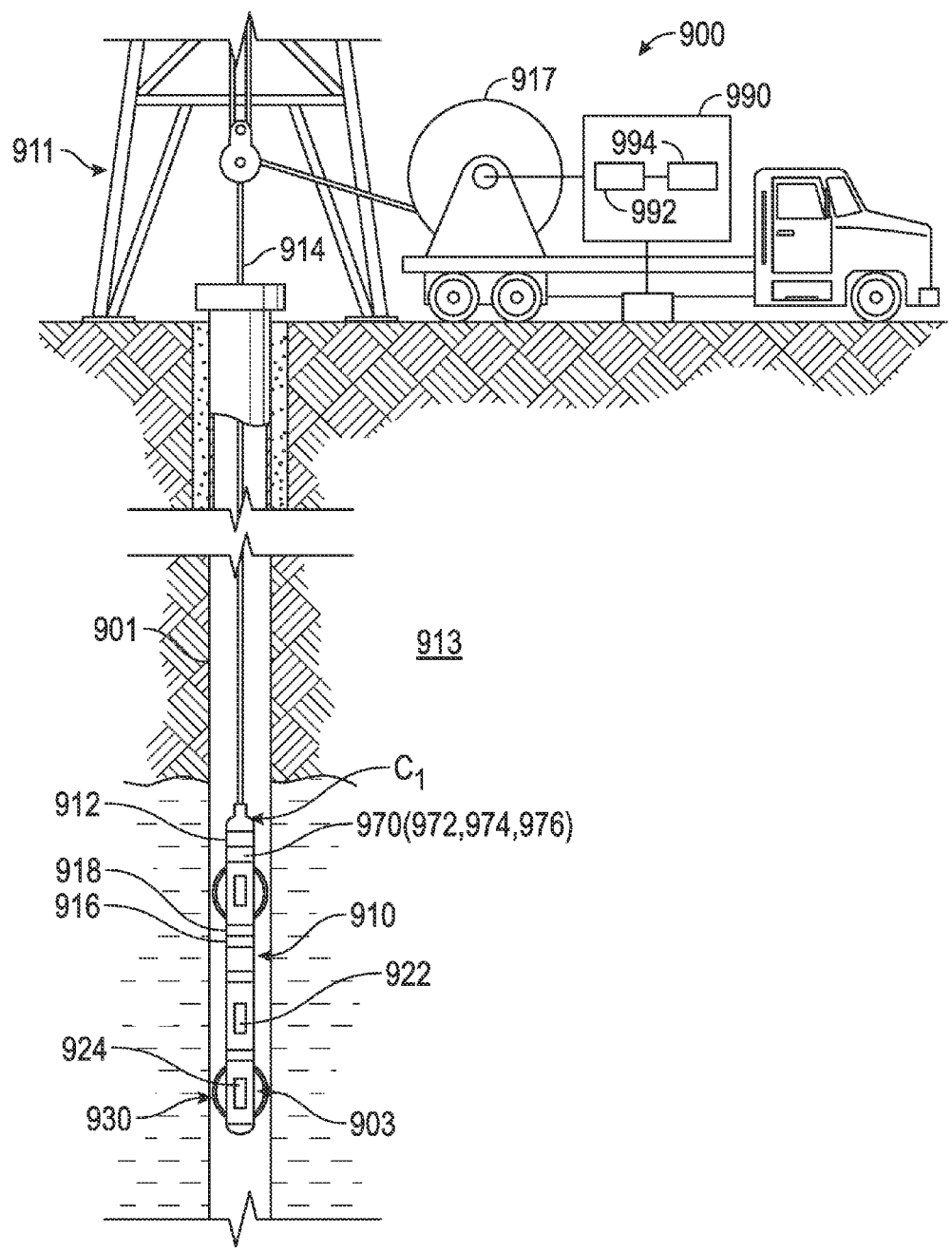
FIG. 9 shows an exemplary measurement event that may occur given various difficult down hole conditions and aberrant drill tool behavior for the disclosed min-max method.

The method of orientation sensor correction may be used in a wireline system (as well as logging-while-drilling (LWD) and measurement-while-drilling (MWD) systems) to determine a tool bias correction over a logging depth. FIG. 9 shows a schematic illustration of an exemplary wireline logging system 900. System 900 is shown to include a logging instrument or tool 910 conveyed into a wellbore or borehole 901 formed in an earth formation 913. The tool 910 may be conveyed into the wellbore 901 by any suitable member 914, such as an electrical armored cable (also referred to as "wireline"), a slick line, a coiled-tubing, etc. The conveying member 914 may be spooled on a winch 917 or similar device known in the art. The conveying member 914 may be conveyed into the wellbore 901 using a platform or rig 915 at the surface. The conveying member 914 is electrically connected at one end to a surface control unit 990 and at the other end to the tool 910. The control unit 990 may be a computer-based system configured to process data or signals provided by the tool 910 to estimate one or more parameters of interest send command signals to various components of the tool 910 and generally control the operation of the tool 910. The control unit 990 includes a processor 992, a data storage device 194 and programs to process data and control the operations of the tool 910. The control unit 910 may also include a display unit and peripherals to enter data and to provide a human interface. A telemetry system 912 may be used to establish bi-directional data communication between the tool 910 and the controller 990. The control unit 990 and the tool 910 also may respectively include a signal decoding and interpretation units 998 and 916 and recording units 994 and 918. The tool 910 also may include a control unit 970, which may further include a processor 972 (such as microprocessor), data storage device 974, such a solid-state memory, and computer programs 976 configured to be used by the processor 972 for executing instructions contained in such programs 976. The signals transmitted by the tool 910 to the surface control unit 990 and the signals transmitted by the control unit 990 to the tool 910 are decoded, interpreted, recorded and processed by their respective control units. The tool 910 further includes an exemplary magnetometer 924 such as the tri-axial magnetometer of FIG. 2. Also shown is an exemplary accelerometer 922 such as the tri-axial magnetometer of FIG. 2. Magnetometer measurements and/or accelerometer measurements may be obtained during a logging operation of the wirelines system or during a tripping of the wirelines tool from the wellbore.

FIG. 2 illustrates a section of the BHA 190 that includes the magnetometer 167 and the accelerometer 169. The magnetometer 167 may be a tri-axial magnetometer having magnetometers ($m_x$, $m_y$, $m_z$) aligned orthogonally to each other. The tri-axial magnetometer includes a z-oriented magnetometer $m_z$ 206 directed along the longitudinal axis of the drill string and two magnetometers (e.g., the x-magnetometer $m_x$ 204 and the y-magnetometer $m_y$ 205) oriented transverse to the longitudinal axis 210 of the drill string. Similarly, accelerometer 169 may be a tri-axial accelerometer with three accelerometers ($a_x$, $a_y$, $a_z$) oriented orthogonally to each other. The tri-axial accelerometer 202 may include an accelerometer $a_z$ 203 oriented along a z-axis (longitudinal axis 210) of the drill string and two accelerometers (x-accelerometer $a_x$ 201 and y-accelerometer $a_y$ 202) oriented transverse to the longitudinal axis 210 of the drill string. The accelerometer and magnetometer measurements may be used to determine a location of the BHA 190 and/or the drill bit 150, a inclination of the drill string 120, an azimuthal orientation of the drill string 120 (e.g., toolface angle) and various other survey measurements. In general, accelerometer measurements ($a_x$, $a_y$, $a_z$) and magnetometer measurements ($m_x$, $m_y$, $m_z$) may be taken during a revolution of the drill string 120 about its longitudinal axis. Measurements are generally at a relatively quick sampling frequency in order to obtain an acceptable number of measurements throughout a single revolution of the BHA 190.

The magnetometers 167 and the accelerometers 169 may include systemic sensor errors that distort the accelerometer and/or the magnetometer measurements, thereby providing residual measurement errors. Systemic sensor errors may be related to several factors, including: bias or offset, different sensor sensitivities (scale factors), differences in the axial locations of the magnetometer components and/or the accelerometer components, misalignment errors, etc. Methods disclosed herein may be used to determine tool sensor corrections that may be used to correct the accelerometer and/or magnetometer measurements for systemic tool errors. The auto-calibrations in this method are of limited scope when compared to a full laboratory calibration.

In the various methods of tool bias correction disclosed herein, the systemic sensor errors, such as a magnetometer bias or an accelerometer bias, may be determined to within a selected accuracy prior to applying the determined bias to correct magnetometer and/or accelerometer measurements. The present disclosure may include reducing the residual measurement error (tool bias) from a first value outside of a selected quality threshold to a second value that is within the selected quality threshold, using any of the methods disclosed herein. For example, in one embodiment, an Extended Kalman Filter may be used to obtain a magnetometer tool bias to within a selected threshold value. In another embodiment, a min-max method may be used to determine minimum and maximum values of magnetometer measurements during a complete revolution of the drill string, thereby allowing a tool bias correction based on minimum and maximum values. In a third embodiment, survey measurements obtained from accelerometer and magnetometer measurements may be used to transform magnetometer measurements from an earth-based coordinate system into a tool-based coordinate system in which tool bias is a constant value and may therefore be determined. The determined tool bias is then used to correct the survey measurements. An iterative loop may be established in which the corrected survey measurements are used to again transform the measurements from the earth-based coordinate system to the tool-based coordinate system, allowing a next iteration of tool bias to be determined in the tool-based coordinate system. The tool bias correction may be repeated for a selected number of iterations or until the determined tool bias is less than a selected threshold value. The various embodiments are discussed in further detail below.

Tool Auto-Calibration Using Local Earth Gravity and Magnetic Field

In one embodiment, tool bias may be determined as a result of transforming standard values of earth's gravity and earth's magnetic field from an earth-based frame of reference into a tool-based frame of reference using transformation variables that are based on the magnetometer measurements and/or accelerometer measurements from a pair of orthogonal triaxial accelerometer and magnetometer sensors. Once the components of the standard values of the magnetic field and of the accelerometer are obtained in the tool-based frame of reference, they may be compared to the measured values of Earth's gravity and Earth's magnetic field obtained using the accelerometer 169 and magnetometer 167. Differences between the standard values and the measured values may therefore yield tool sensor bias vector, misalignment and scale factor corrections. These determined sensor corrections may be used to correct accelerometer and magnetometer measurements and, additionally, to correct or adjust the transformation variables. These adjusted transformation variables may then be used to perform another transformation of the standard values of the Earth's gravitational field and the Earth's magnetic field into the tool reference frame in order to iteratively converge to a solution for the tool sensor corrections.

The following definitions, assumptions and observations are used herein:

Definitions
  The Earth's fields as defined in the selected Earth main field models are assumed to be exact, e.g. World Geodetic System 1984, WGS-84, maintained by U.S. National Imagery and Mapping Agency, NIMA, and the International Geomagnetic Reference Field, IGRF, maintained by the U.S. Geologic Survey, USGS.
  Any measured field differences will be described by anomalies.
  The Earth's fields will always be preceded by 'Earth' s', as in Earth's magnetic field.
  The accelerometer measurements, including sensor acceleration will be referred to as gravitational field—from the accelerometer observation point, the gravitational field and acceleration are indistinguishable.
  The magnetometer measurements will be referred to as magnetic field.

Assumptions:
  The Earth's fields are constant over the time duration and spatial range of the logging run.
  Local magnetic anomalies are constant over the duration of the logging run.
  Systemic sensor errors including tool string magnetization are constant over the logging run Observations:
  The Earth's fields are constant in the local Earth coordinate system
  The Systemic sensor errors are constant in the sensor coordinate system, unless otherwise specified.

Figure 10:
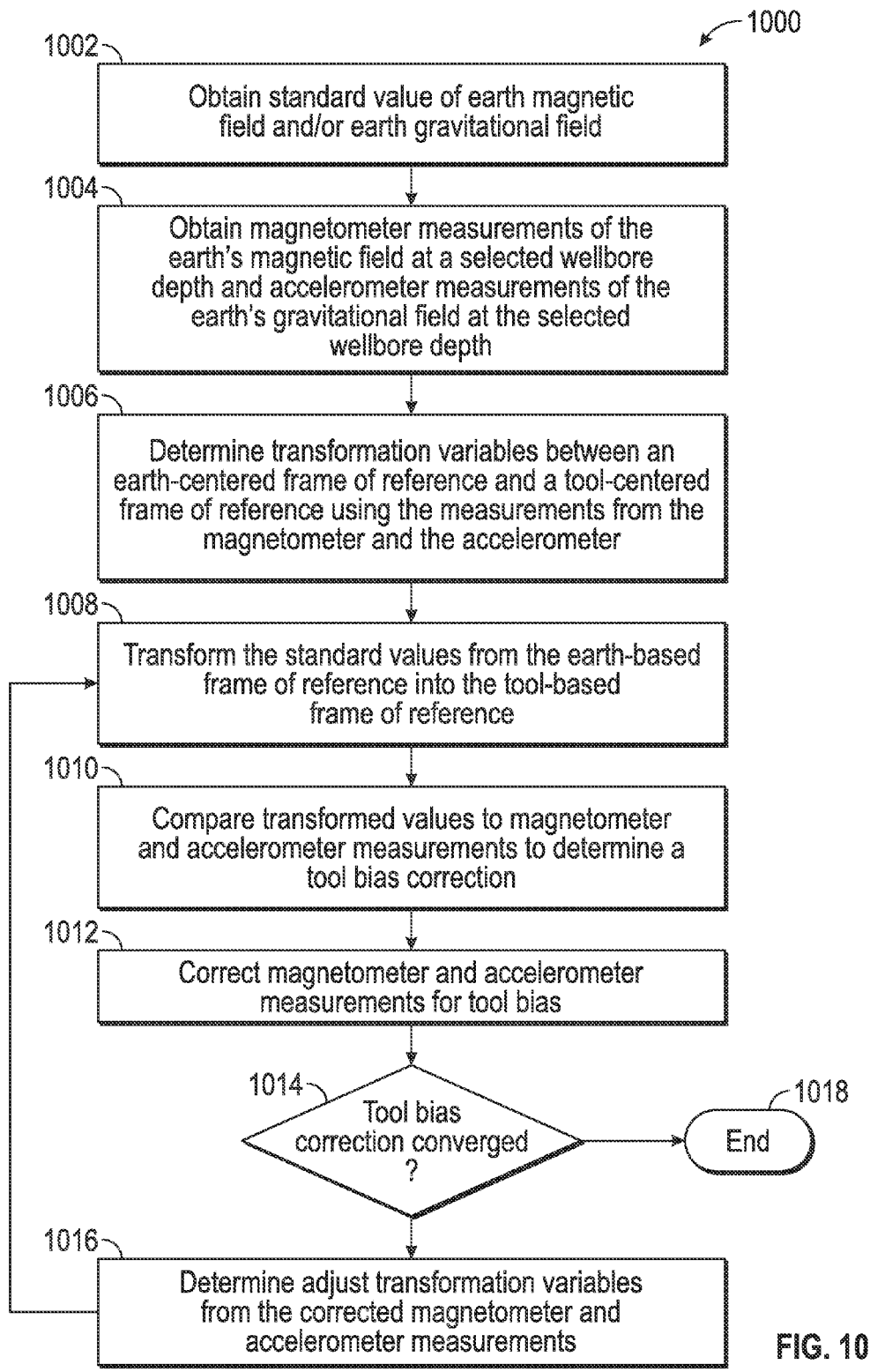
FIG. 10 shows a flowchart illustrating an exemplary method of magnetic bias correction in one embodiment of the present disclosure.

FIG. 10 shows a flowchart 1000 illustrating an exemplary method of magnetic anomaly extraction in one embodiment of the present disclosure. In box 1002, standard values of the earth's magnetic field and/or the earth's gravitational field are obtained. For instance, the Earth's magnetic field may be a known value estimated from the latitude and longitude in the International Geophysical Reference Field (IGRF) or another suitable value. In box 1004, magnetic field measurements and gravitational field measurements are obtained using the magnetometer accelerometer of the wireline system. The magnetic field measurements and gravitational field measurements are in a tool-based frame of reference. In box 1006, the obtain magnetic field measurements and gravitational field measurements are used to determine orientation and direction variables of the drill string. These variables may include the inclination of the tool, the relative bearing of the tool, and the borehole azimuth (AZ) (or the wireline drift azimuth). Since, these variables are experimentally determined, they have an error in them which may be due, for example, to tool bias or residual measurement error.

Angles such as the inclination (DEV) (wireline deviation) and relative bearing (RB) to the high side of the tool may be computed using accelerometer measurements. Inclination is an angle between vertical and the borehole at the point of measurement. The relative bearing is the angle between the tool string's defined x-axis and the high side of the tool. Horizontal azimuth (HAZI) (AZ wireline) may be defined as a projection of the magnetic vector on the tool face (i.e., the place perpendicular to the z-axis) onto the local horizontal plane. We will use the LWD conventions, rather than the wireline conventions, except for the LWD inclination where DEV will be used to avoid any confusion related to the magnetic inclination. The borehole azimuth or drift azimuth (AZ) is the projection of the z-axis of the well bore onto the horizontal plane. These reference angles are related by the equations:

$$\tan(HAZI - AZ) = \frac{\tan(RB)}{\cos(DEV)} \qquad \text{Eq. (1)}$$

which may be used as a consistency check on orientation data. The orientation data may be computed from the raw accelerometer data using for example, a z-down, x-north and y-east right-handed coordinate system. The inclination may be given by:

$$DEV = \delta = \tan^{-1}\left(\frac{\sqrt{a_x^2 + a_y^2}}{a_z}\right) \qquad \text{Eq. (2)}$$

Relative bearing (RB) may be given by:

$$RB = \psi = \tan^{-1}\left(\frac{-a_x}{-a_y}\right) \qquad \text{Eq. (3)}$$

Azimuth may be given by:

$$AZ = \phi = \tan^{-1}\left(\frac{-A(a_x m_y - a_y m_x)}{-a_z(a_x m_x + a_y m_y) + m_z(a_x^2 + a_y^2)}\right) \qquad \text{Eq. (4)}$$

where $$A = \sqrt{a_x^2 + a_y^2 + a_z^2} \qquad \text{Eq. (5)}$$

and $$maginc = \theta = \tan^{-1}\left(\frac{A \cdot B}{(A \cdot A)(M \cdot M) - (A \cdot M)^2}\right) \qquad \text{Eq. (6)}$$

where $(a_x, a_y, a_z)$ and $(m_x, m_y, m_z)$ are the measured component values of acceleration and magnetic field strength respectively at each sample position in the tool coordinate system. 'A' is the magnitude of the acceleration, which represents the acceleration due to gravity. The bold italic font indicates a vector. A bold normal font will indicate a matrix.

In Equations (1)-(6), the measured magnetic and acceleration components are assumed to be accurate (after accelerometer component filtering, if needed). However, systemic sensor error, sensor acceleration or another magnetic source near the sensors affect the estimate of the borehole azimuth, magnetic field strength and magnetic inclination. The measured fields are the vector sum of the Earth's fields, G (gravity), B (magnetic field) and the systemic sensor errors and tool acceleration or anomalous gravity field a and anomalous magnetic field b at the sensor.

$$M = B + b \qquad \text{Eq. (7)}$$

$$B = M - b$$

$$A = G + a \qquad \text{Eq. (8)}$$

$$G = A - a$$

The sensor measurements are made in the tool body coordinate system. The x- and y-axes are perpendicular to the longitudinal axis of the tool while the z-axis is parallel to the longitudinal axis of the tool forming a right handed coordinate system. Positive z-axis increases in the down hole direction, that is, positive z increases depth. The method of this disclosure estimates the value of the correction vectors a and b.

Because of the systemic sensor errors, the computed orientations, the borehole azimuth and magnetic inclination are in error in Eqs. (1)-(6). Equations (4) and (6) may be modified to obtain Eqs. (9) and (10), as follows:

$$\phi(A, M) = \tan^{-1}\left( \frac{-A(a_x(m_y - b_y) - a_y(m_x - b_x))}{-a_z(a_x(m_x - b_x) + a_y(m_y - b_y)) + (m_z - b_z)(a_x^2 + a_y^2)} \right) \qquad \text{Eq. (9)}$$

$$\theta(A, M) = \tan^{-1}\left( \frac{(A-a) \cdot (M-b)}{((A-a) \cdot (A-a))((M-b) \cdot (M-b)) - ((A-a) \cdot (M-b))^2} \right) \qquad \text{Eq. (10)}$$

using the following substitutions: $a_x \to A_x - a_x$, $a_y \to A_y - a_y$, and $a_z \to A_z - a_z$, An additional complication occurs because the known components of the Earth's fields are not known in the tool coordinate system. Getting the values for the components of the Earth field in the tool coordinate system requires several rotations. First, there is a rotation of the Earth magnetic north-east-down coordinate system about the z-axis by the azimuth angle, $\phi$, to align the y-axis of the Earth coordinate system with the y-axis of the borehole in a local vertical reference frame. Secondly, there is a rotation rotate about a well deviation, $\delta$, (Eq. (2)) to align the z-axis of the rotated Earth coordinate system with the well bore. Thirdly, there is a rotation about the tool string z-axis by the relative bearing to high side, $\psi$, to align the rotated Earth coordinate system with the tool x- and y-axes. At this point, if the correction vector is zero, e.g. b=(0,0,0), the measurements of the fields by the tool are equal the Earth's field as projected onto the tool coordinate to within the accuracy and noise limits of the sensors. In general, however, the correction vector will not be zero, and the magnetic disturbance vector is sufficiently large to cause directional errors.

In box 1008, the standard values of the earths' magnetic field and the earth's gravitational field are transformed from the earth-centered frame of reference to the tool-based frame of reference using the determine angles $\delta$, $\psi$, $\phi$ and $\theta$ determined from Eqs. (1) (6). Transformation of the standard values of the Earth's magnetic field into the tool coordinate system may be given by standard rotation vectors:

$$M_{tool} = B_{earth} R(\psi) R(\delta) R(\phi) \hat{I}(\theta) \qquad \text{Eq. (11)}$$

where R are orthonormal rotation matrices, and $\hat{I}$ is a unit vector in the direction of the Earth's magnetic field in the local Earth coordinate system and depends on the magnetic inclination, that is, $\hat{I}(\theta) = (\cos(\theta), 0, \sin(\theta))$. Similarly, the transformation of the standard value of the gravitational field into the tool coordinate system may be given by $$A_{tool} = G_{earth} R(\psi) R(\delta) \hat{G} \qquad \text{Eq. (12)}$$

where G is a unit vector in the direction of the Earth's gravitational field in the local Earth coordinate system, and defines down, that is $\hat{G} = (0,0,1)$.

In box 1012, components of the determined first bias correction vector are applied to the magnetometer and accelerometer measurements to correct these measurements for tool bias. In box 1014, a determination is made as to whether the determined tool bias measurements have converged to within a selected value. The determined tool bias may be compared to a selected threshold value. Alternatively, since the method described by flowchart 1000 is an iterative process, the determined tool bias may be compared to a tool bias determined to one or more previous iterations. Also, the process accepts a tool bias correction that is obtained after a predetermined number of iterations of the method of flowchart 1000.

If the tool bias is considered to have converged to within a selected value, then the process ends at box 1018. Otherwise, the process continues to box 1016, wherein the transformation variables, i.e., $\delta$, $\phi$, $\psi$ and $\theta$, are recalculated using the values of the tool's magnetometer measurements and accelerometer measurement corrected for the determined tool bias. The process then returns to box 1008 in which the standard values are once again transformed into the tool-based frame of reference.

Earth's Gravitational Field in Tool Coordinates

As discussed herein, the term used to describe the Earth's gravity is the gravitational field strength. The gravitational field strength and the acceleration due to gravity describe the same physical quantity. However, the acceleration due to gravity may have a more restricted meaning to some readers. For example, the global average acceleration due to gravity for the Earth (9.80665 m/sec$^2$). A local determination of latitude is dependent on acceleration due to gravity at mean sea level.

In general, the gravitation field is known in an earth coordinate system, while the accelerometer measurements are obtained in a tool coordinate system. To process the accelerometer data, it is understood to transform data into a same coordinate system. As with the magnetometer data discussed hereinabove, orientation information is affected by the accelerometer biases.

The method herein rotates the gravity vector from its natural Earth coordinate system into the tool coordinate system. First, there is a rotation about the y-axis by the deviation to align the Earth z-axis with the well bore. Then there is a rotation about the z-axis by the relative bearing to align the Earth frame with the tool body coordinate system ($\delta$=well bore deviation, $\psi$=well bore drift azimuth). These rotations are shown below in Eq. (13):

$$G = Ge R(\psi) \cdot R(\delta) \cdot \hat{G} \quad \text{Eq. (13)}$$

where $\hat{G}$ is a unit vector in the direction of the magnetic field, and the R are rotation matrices and are expanded below, $\psi$ is the relative bearing to highside, $\delta$ is the deviation and $\phi$ is the azimuth.

$$G = Ge \cdot \begin{bmatrix} \cos\psi & \sin\psi & 0 \\ -\sin\psi & \cos\psi & 0 \\ 0 & 0 & 1 \end{bmatrix} \begin{bmatrix} \cos\delta & 0 & -\sin\delta \\ 0 & 1 & 0 \\ \sin\delta & 0 & \cos\delta \end{bmatrix} \cdot \begin{bmatrix} 0 \\ 0 \\ 1 \end{bmatrix} \quad \text{Eq. (14)}$$

By expanding $$G = Ge \cdot \begin{bmatrix} \cos\psi\cos\delta & \sin\psi & -\cos\psi\sin\delta \\ -\sin\psi\cos\delta & \cos\psi & \sin\psi\sin\delta \\ \sin\delta & 0 & \cos\delta \end{bmatrix} \cdot \begin{bmatrix} 0 \\ 0 \\ 1 \end{bmatrix} \quad \text{Eq. (15)}$$

$$G = Ge \cdot \begin{bmatrix} -\cos\psi\sin\delta \\ \sin\psi\sin\delta \\ \cos\delta \end{bmatrix}$$

This equation provides the x-, y- and z-axis components of the Earth gravity field in the tool body coordinate system, where $$G_x = -Ge \cos\psi \sin\delta \quad \text{Eq. (16)}$$

$$G_y = Ge \sin\psi \sin\delta$$

$$G_z = Ge \cos\delta$$

are the components of the Earth field in the tool coordinate system.

The Earth magnetic field, in a magnetic north, z-down coordinate system may be represented by a magnitude and an inclination as $$B = Be(\cos(\theta)\hat{i} + \sin(\theta)\hat{k}) \quad \text{Eq. (17)}$$

in the local Earth's coordinate system, that is, x-magnetic north, y-magnetic east, z-down, (NED) where $B_e$ is the magnitude of the Earth's magnetic field strength and $\theta$ is the magnetic inclination at the location of interest. The Earth's magnetic field may be estimated from the latitude and longitude in the International Geophysical Reference Field, (IGRF) which is updated every five years by the US Geological Survey, or the British Geological Geomagnetic Model, BGGM, which is updated annually and others. Or the field may be measured at the location of interest using well known methods. With the choice of a magnetic north system, there is of course, no y-axis component.

Earth's Magnetic Field in Tool Coordinates

To obtain the Earth's magnetic field in the tool coordinate system, one first rotates about the z-axis by the azimuth, $\phi$, to align the Earth coordinate system y-axis with the well y-axis. Then one rotates about the y-axis by the deviation to align the Earth z-axis with the well bore. Then one rotates about the z-axis by the relative bearing to align the Earth frame with the tool body coordinate system. ($\delta$=well bore deviation, $\phi$=well bore azimuth, $\psi$=relative bearing to high-side $\theta$=magnetic inclination). Such rotations are shown in Eq. (18):

$$B = BR(\psi) \cdot R(\delta) \cdot R(\phi) \cdot I(\phi) \quad \text{Eq. (18)}$$

where I is a unit vector in the direction of the magnetic field, and the R are rotation matrices and are expanded below. $\psi$ is the relative bearing to high-side, $\delta$ is the deviation, $\phi$ is the azimuth and $\theta$ is the magnetic inclination.

$$B = Be \cdot \begin{bmatrix} \cos\psi & \sin\psi & 0 \\ -\sin\psi & \cos\psi & 0 \\ 0 & 0 & 1 \end{bmatrix} \cdot \quad \text{Eq. (19)}$$

$$\begin{bmatrix} \cos\delta & 0 & -\sin\delta \\ 0 & 1 & 0 \\ \sin\delta & 0 & \cos\delta \end{bmatrix} \begin{bmatrix} \cos\phi & \sin\phi & 0 \\ -\sin\phi & \cos\phi & 0 \\ 0 & 0 & 1 \end{bmatrix} \cdot \begin{bmatrix} \cos\theta \\ 0 \\ \sin\theta \end{bmatrix}$$

By expanding $$B = Be \cdot \begin{bmatrix} \cos\psi\cos\delta & \sin\psi & -\cos\psi\sin\delta \\ -\sin\psi\cos\delta & \cos\psi & \sin\psi\sin\delta \\ \sin\delta & 0 & \cos\delta \end{bmatrix} \begin{bmatrix} \cos\phi & \sin\phi & 0 \\ -\sin\phi & \cos\phi & 0 \\ 0 & 0 & 1 \end{bmatrix} \cdot \begin{bmatrix} \cos\theta \\ 0 \\ \sin\theta \end{bmatrix}$$

Continuing the expansion $$B = Be \begin{bmatrix} \cos\psi\cos\delta\cos\phi - \sin\psi\sin\phi & \cos\psi\cos\delta\sin\phi + \sin\psi\cos\phi & -\cos\psi\sin\delta \\ -\sin\psi\cos\delta\cos\phi - \cos\psi\sin\phi & -\sin\psi\cos\delta\sin\phi + \cos\psi\cos\phi & \sin\psi\sin\delta \\ \sin\delta\cos\phi & \sin\delta\sin\phi & \cos\delta \end{bmatrix} \begin{bmatrix} \cos\theta \\ 0 \\ \sin\theta \end{bmatrix}$$

Further continuing the expansion, Eq. (20) is obtained.

$$B = Be \begin{bmatrix} \cos\psi\cos\delta\cos\phi\cos\theta - \cos\psi\sin\delta\sin\theta - \sin\psi\sin\phi\cos\theta \\ -\sin\psi\cos\delta\cos\phi\cos\theta + \sin\psi\sin\delta\sin\theta - \cos\psi\sin\phi\cos\theta \\ \sin\delta\cos\phi\cos\theta + \cos\delta\sin\theta \end{bmatrix} \quad \text{Eq. (20)}$$

Eq. (20) gives the x-, y- and z-axis components of the Earth magnetic field in the tool body coordinate system, where $$B_x = Be(\cos\psi \cos\delta \cos\phi \cos\theta - \cos\psi \sin\delta \sin\theta - \sin\psi \sin\phi \cos\theta) \quad \text{Eq. (21)}$$

$$B_y = Be(-\sin\psi \cos\delta \cos\phi \cos\theta + \sin\psi \sin\delta \sin\theta - \cos\psi \sin\phi \cos\theta)$$

$$B_z = Be(\sin\delta \cos\phi \cos\theta + \cos\delta \sin\theta)$$

are the components of the Earth field in the tool coordinate system.

Measured Data Properties, Tool Body Coordinate System

Measurements of the magnetic field may be obtained at an orthogonal tri-axial sensor with orthogonal x- and y-axes perpendicular to a longitudinal axis of the instrument, and with the z-axis parallel to the longitudinal axis. The sensors define a right-handed coordinate system with z increasing in a down hole direction. Generally, the x-axis is defined as the tool rotation reference. A measurement with such a system results in the vector magnetic field measurement $$M = M_x \hat{i}' + M_y \hat{j}' + M_z \hat{k}'$$

where i', j', and k' are unit vectors in the tool body.

For measurements affected by magnetometer bias and/or tool (or tool string), borehole magnetic fields or paleomagnetic fields, an additional vector field component is added to the measured field. This additional vecor field is a magnetic correction vector and is given by Eq. (22):

$$b = b_x \hat{i}' + b_y \hat{j}' + b_z \hat{k}' \quad \text{Eq. (22)}$$

Eq. (22) includes magnetic bias errors, magnetic field systemic errors and local field anomalies in a single term.

Thus, the measurement of the Earth magnetic field may be:

$$B = M - b \quad \text{Eq. (23)}$$

providing a corrected measured magnetic field.

$$B = (M_x - b_x)\hat{i}' + (M_y - b_y)\hat{j}' + (M_z - b_z)\hat{k}' \quad \text{Eq. (24)}$$

$$B = \sqrt{(M_x - b_x)^2 + (M_y - b_y)^2 + (M_z - b_z)^2} \quad \text{Eq. (25)}$$

When the tri-axial magnetometer sensor is combined with a tri-axial accelerometer subsystem, where each accelerometer is parallel to one of the magnetometer axes, the additional measurements of the acceleration due to gravity may be determined. Since the gravity vector and the Earth magnetic vectors normally point in different directions (except very near the magnetic poles), the gravity and magnetic vectors can be used to define a local coordinate system that can be determined by the sensor measurements, e.g. z-down, magnetic north, east coordinate system.

Equations for accelerometer measurements are similarly straight forward:

$$A = A_x \hat{i}' + A_y \hat{j}' + A_z \hat{k}' \quad \text{Eq. (26)}$$

$$A = \sqrt{A_x^2 + A_y^2 + A_z^2} \quad \text{Eq. (27)}$$

where A is the magnitude of the measured magnitude of the gravitational field. A is the measured acceleration due to gravity vector. However, physical accelerometers generally have systemic error sources, a. This systemic errors modifies the measured acceleration similarly to the magnetizer systemic errors discussed above. Thus, corrected acceleration measurements may be written as:

$$G = A - a \quad \text{Eq. (28)}$$

where G is a true gravitational field strength, A is a measured gravitation field strength, and a is a correction vector for the accelerometers. The correction vector for the gravitational field strength may thus be given by $$\vec{G} = (A_x - a_x)\hat{i}' + (G_y - a_y)\hat{j}' + (G_z - a_z)\hat{k}'$$

The magnitude of the correction vector for the gravitational field may therefore be given as:

$$G = \sqrt{(A_x - a_x)^2 + (A_y - a_y)^2 + (A_z - a_z)^2} \quad \text{Eq. (29)}$$

where the $A_x$, $A_y$ and $A_z$ are the individual accelerometer measurements, and $a_x$, $a_y$ and $a_z$ are the components of the correction vector. The tool inclination from vertical with accelerometer bias is then written as:

$$\delta(\vec{a}) = \tan^{-1}\left(\frac{\sqrt{(A_x - a_x)^2 + (A_y - a_y)^2}}{A_z - a_z}\right) \quad \text{Eq. (30)}$$

and the rotation angle to high side becomes:

$$\psi(\vec{a}) = \tan^{-1}\left(\frac{-(A_x - a_x)}{-(A_y - a_y)}\right) \quad \text{Eq. (31)}$$

Since the Earth's gravity vector and the magnetic vectors normally point in different direction, (except very near the magnetic poles) the gravity and magnetic vectors can be used to define a z-down, magnetic north, east coordinate system, NED. With these two defined coordinate systems, the magnetic inclination and the borehole azimuth may be determined. The magnetic inclination can be used as a quality check once tool biases have been resolved.

In one embodiment, the measured Earth's field is corrected to substantially equal the Earth's field. From Eq. (23)

$$0 = M - B - b \quad \text{Eq. (32)}$$

From Eq. (28):

$$0 = A - G - a \quad \text{Eq. (33)}$$

Equations (32) and (33) may be solved to estimate the correction vectors a and b. The systemic error sources and the acceleration and anomalous magnetic fields are contained in the correction terms. However, vectors a and b also appear in calculations of the sensor orientation. Thus, the magnitude of the error depends on the magnitude of the sensor correction vectors. This may be formalized into a matrix equation of the form $$D = \Psi(a) \quad \text{Eq. (34)}$$

where D is a data vector, $\Psi$ is a matrix operator and a is a correction vector. Since we are making three independent measurements, the data vector D has dimensions of N×3 (N rows and 3 columns) matrix where N is the number of data points. Since we are interested in solving for the model vector, a, we may invert Eq. (33) to obtain:

$$a = (\Psi(D))^{-1} \quad \text{Eq. (35)}$$

The inversion shown in Eq. (33) is generally a non-linear inversion. However, a linear inverse problem may be posed as the generalized Lanczos inverse:

$$a = (\Psi^T \Psi)^{-1} \Psi^T D \quad \text{Eq. (36)}$$

A residual vector is defined for accelerometers as follows:

$$\epsilon = A - \Psi(a) \quad \text{Eq. (37)}$$

$$\Psi(a) = G \cdot \begin{bmatrix} -\cos\psi \sin\delta \\ \sin\psi \sin\delta \\ \cos\delta \end{bmatrix} + \begin{bmatrix} a_x \\ a_y \\ a_z \end{bmatrix} \quad \text{Eq. (38)}$$

A residual vector is defined for magnetometers as follows:

$$\epsilon = M - \Psi(b) \quad \text{Eq. (39)}$$

$$\Psi(b) = \quad \text{Eq. (40)}$$

$$B \cdot \begin{bmatrix} \cos\psi\cos\delta\cos\phi\cos\theta - \cos\psi\sin\delta\sin\theta - \sin\psi\sin\phi\cos\theta \\ -\sin\psi\cos\delta\cos\phi\cos\theta + \sin\psi\sin\delta\sin\theta - \cos\psi\sin\phi\cos\theta \\ \sin\delta\cos\phi\cos\theta + \cos\delta\sin\theta \end{bmatrix} +$$

-continued $$\begin{bmatrix} b_x \\ b_y \\ b_z \end{bmatrix}$$

where G and B are the magnitudes of the Earth's gravitational and magnetic fields respectively. And the residual vector $\epsilon$ is the error for each component of the data vectors, and can be represented as either an N×3 array or 3N×1 vector. Equations (37)-(40) may be combined into a single six parameter model. The methods disclosed herein reduce or minimize residual error. Using a non-specific terminology of the form of Eqs. (37) and (38), magnitude of the error may be computed by a sum of the squares of the errors in each component, which in matrix notation is given by $\epsilon^T \epsilon$. The condition for a minimum is:

$$\frac{\partial}{\partial a}[(H - \Psi(a))^T (H - \Psi(a))] = 0 \qquad \text{Eq. (41)}$$

where the derivatives imply partial differentiation over the components of the model vector a. Equation (37) may be solved, using the Levenberg-Marquardt method $$(J_k^T J_k + \lambda I) \cdot p_k = J_k^T \epsilon^k \qquad \text{Eq. (42)}$$

where J is the Jacobian, I is the identity matrix, $\lambda$ is a non-negative scalar damping parameter, and the equation is evaluated at the $k^{th}$ iteration and $P_k$ is the step direction at the $k^{th}$ iteration. The larger $\lambda$ is, the greater the damping effect. The choice for the damping parameter is subjective and data set dependent, and can nominally vary from zero to very large (mathematically to infinity). The Jacobian is defined as:

$$J_{i,j,k} = \frac{\partial f(a_k)}{\partial a_j} \bigg| a = a_i \text{ and } i = 1, I; j = 1, M; k = 1, M \qquad \text{Eq. (43)}$$

where M is the number of model parameters and the Jacobian is evaluated at each data point i. The problem may be solved recursively using the recursion relation $$\Delta a_m = (J^T \cdot j + \lambda I)^{-1} j^T \cdot \epsilon_m \qquad \text{Eq. (44)}$$

where m is an iteration counter, $\lambda$ is a damping factor, and $\Delta a$ is an update vector. The new model estimate becomes $$\vec{a}_m = \vec{a}_m + \vec{\Delta a}_m \text{ where } \vec{a}_{m=0} = \text{initial solution estimate} \qquad \text{Eq. (45)}$$

and the initial estimate for a is an educated guess. The guess is normally based on some knowledge of the expected solution values and the expected range of values expected for a solution. The method iterates until the residual vector reaches some predetermined tolerance, or the iteration count has been exceeded, in which case the solution did not converge or converged too slowly. The damping factor $\lambda$ has the effect of a low pass filter and decreases the variability of the model from iteration to iteration, and helps to stabilize the solution.

From equations (7) and (8), a generic measured field obtained at a sensor set may be given in the tool axes by the equation of the form:

$$F = SAM + c \qquad \text{Eq. (46)}$$

where F is either of the general Earth fields, S is a scale factor matrix, A is a misalignment matric and c is a correction vector. The scale factor matrix is a diagonal matrix provides the correct scale factor to each of the tri-axial measurements:

$$S = \begin{bmatrix} S_x & 0 & 0 \\ 0 & S_y & 0 \\ 0 & 0 & S_z \end{bmatrix} \qquad \text{Eq. (47)}$$

with $S_x = S_y = S_z = 1$ nominally.

The misalignment matrix A of Eq, (46) describes any misalignment of the x-, y- and z-axes with respect to the tool axis and is given by a triple matrix product of three coordinate rotations, one about each coordinate axis by the misalignment relative to the coordinate system:

$$A = \begin{bmatrix} 1 & 0 & 0 \\ 0 & \cos(\phi_x) & \sin(\phi_x) \\ 0 & -\sin(\phi_x) & \cos(\phi_x) \end{bmatrix} \begin{bmatrix} \cos(\phi_y) & 0 & \sin(\phi_y) \\ 0 & 1 & 0 \\ -\sin(\phi_y) & 0 & \cos(\phi_y) \end{bmatrix}$$

$$\begin{bmatrix} \cos(\phi_z) & -\sin(\phi_z) & 0 \\ \sin(\phi_z) & \cos(\phi_z) & 0 \\ 0 & 0 & 1 \end{bmatrix}$$

A selected sensor orientation to provide scale factor calibration in a rapidly rotating system is the orientation that satisfies the following direction cosine condition: $\sqrt{\cos^2(x) + \cos^2(y) + \cos^2(y)} = 1$, where the angles are the angle from each axis of the sensor orthogonal coordinate system to the rotation axis, x the angle from the x-axis, y the angle from the y-axis, z the angle from the z-axis, subject to the condition that the angles satisfy x=y=z, then $\sqrt{3\cos^2(x)} = 1$, and $x = 1/\sqrt{3} \cong 54.7356°$.

By defining our coordinate system such that the z-axis is not misaligned, that is, it is perfectly aligned with our sensor coordinate system, the misalignment reduces to $$A = \begin{bmatrix} 1 & 0 & 0 \\ 0 & \cos(\phi_x) & \sin(\phi_x) \\ 0 & -\sin(\phi_x) & \cos(\phi_x) \end{bmatrix} \begin{bmatrix} \cos(\phi_y) & 0 & \sin(\phi_y) \\ 0 & 1 & 0 \\ -\sin(\phi_y) & 0 & \cos(\phi_y) \end{bmatrix} \qquad \text{Eq. (48)}$$

which becomes $$A = \begin{bmatrix} \cos(\phi_y) & 0 & \sin(\phi_y) \\ \sin(\phi_x)\sin(\phi_y) & \cos(\phi_x) & -\sin(\phi_x)\cos(\phi_y) \\ -\cos(\phi_x)\sin(\phi_y) & \sin(\phi_x) & \cos(\phi_x)\cos(\phi_y) \end{bmatrix} \qquad \text{Eq. (49)}$$

In noting that the misalignments are very small, small angle approximations may be applied: $(\cos(\alpha) \cong 1, \sin(\alpha) \cong \alpha)$ to obtain $$A = \begin{bmatrix} 1 & 0 & \phi_y \\ 0 & 1 & -\phi_x \\ -\phi_y & \phi_x & 1 \end{bmatrix} \qquad \text{Eq. (50)}$$

Now we redefine A, such that $$I + A = \begin{bmatrix} 1 & 0 & \phi_y \\ 0 & 1 & -\phi_x \\ -\phi_y & \phi_x & 1 \end{bmatrix} \quad \text{Eq. (51)}$$

and $$A = \begin{bmatrix} 0 & 0 & \phi_y \\ 0 & 0 & -\phi_x \\ -\phi_y & \phi_x & 0 \end{bmatrix} \quad \text{Eq. (52)}$$

Eq. (46) may then be rewritten as $$F = S[I+A]M + c \quad \text{Eq. (53)}$$

From equations (37)-(40) we have:

$$\epsilon = A - \Psi(a) \quad \text{Eq. (54)}$$

$$\Psi(a) = Ge \cdot S[I + \Lambda] \begin{bmatrix} -\cos\psi \sin\delta \\ \sin\psi \sin\delta \\ \cos\delta \end{bmatrix} + \begin{bmatrix} a_x \\ a_y \\ a_z \end{bmatrix} \quad \text{Eq. (55)}$$

where we have substituted the symbol A for the misalignment to avoid confusion for the gravity field measurement A.

$$\Sigma = M - \Psi(b) \quad \text{Eq. (56)}$$

$$\Psi(b) = B \cdot S[I + A] \quad \text{Eq. (57)}$$

$$\begin{bmatrix} \cos\psi \cos\delta \cos\phi \cos\theta - \cos\psi \sin\delta \sin\theta - \sin\psi \sin\phi \cos\theta \\ -\sin\psi \cos\delta \cos\phi \cos\theta + \sin\psi \sin\delta \sin\theta - \cos\psi \sin\phi \cos\theta \\ \sin\delta \cos\phi \cos\theta + \cos\delta \sin\theta \end{bmatrix} + \begin{bmatrix} b_x \\ b_y \\ b_z \end{bmatrix}$$

The problem to be solved has been extend to include scale factor and axes misalignment; therefore, the Eqs. (32) and (33) may thus be rewritten as:

$$0 = M - S[I+A]B(\delta,\psi,\phi,\theta) - b \quad \text{Eq. (58)}$$

$$0 = A - S[I+\Lambda]G(\delta,\psi) - a \quad \text{Eq. (59)}$$

where $$B(\delta, \psi, \phi, \theta) = B \quad \text{Eq. (60)}$$

$$\begin{bmatrix} \cos\psi \cos\delta \cos\phi \cos\theta - \cos\psi \sin\delta \sin\theta - \sin\psi \sin\phi \cos\theta \\ -\sin\psi \cos\delta \cos\phi \cos\theta + \sin\psi \sin\delta \sin\theta - \cos\psi \sin\phi \cos\theta \\ \sin\delta \cos\phi \cos\theta + \cos\delta \sin\theta \end{bmatrix}$$

and $$G(\delta, \psi) = Ge \begin{bmatrix} -\cos\psi \sin\delta \\ \sin\psi \sin\delta \\ \cos\delta \end{bmatrix} \quad \text{Eq. (61)}$$

for the magnetometers and accelerometers respectively. The functional dependencies of B and G have been added to the notation for emphasis.

The method described above for the correction vector may be applied to determine the correction vector, which essentially shifts the origin to (0,0). Using corrected data, the method may solve for the scale factor and then use the scale factor corrected data to correct for the misalignment, or vice versa. Several iterations may be used. The number of iterations may be reduced after a few acquisition cycles by pre-correcting scale factor and misalignment updates with the latest correction values.

Since accelerometer solutions do not rely on any magnetometer data, the accelerometer corrections may be determined first, then used to solve the magnetometer data. Eqs. (58) and (59) describe the systems of equations that are to be solved. These methods may be extended to include temperature errors, using temperature coefficients, e.g. $b_x = {}^0b_x + {}^Tb_x T$.

Magnetometer Correction Using an Extended Kalman Filter

In one embodiment, systemic magnetometer measurement errors may be determined using a method of an Extended Kalman Filter (EKF) in a rapidly rotating system. The EKF enables the correction of bias, scale factor and misalignment errors on x-oriented and y-oriented magnetometers during the data acquisition process. The EKF also enables a scale factor for the x-directed and y-directed magnetometers to be equalized so that the relative scale errors or sensitivities among the x- and y-oriented magnetometers do not affect toolface angle calculations. Due to use of the EKF, an estimated bias uncertainty may be available after each magnetometer measurement is obtained. Thus, an operator may be able to specify a selected level of accuracy and select that no output be given if this level is not achieved. Thus, the operator may ensure down hole calibration of the x- and y-oriented magnetometers to a specified level of accuracy at any inclination and/or azimuth of the drill string. In an exemplary embodiment, the specified level of accuracy may be less than about 10 nanoTesla.

Equations (56)-(59) disclose an exemplary model of determining actual magnetometer measurements from measurement magnetic field values. The measured magnetic field obtained at a magnetometer may be given in the tool axes by the equation (F=S[I+A]M+c where the nomenclature has been modified to this particular method:

$$B_m^{TF} = S[I+M]B^{TF} + b \quad \text{Eq. (62)}$$

where $B^{TF}$ is the true or actual value of the magnetic field, S is a scale factor matrix whose components are related to the scales of the tri-axial magnetometer components and is given by $$S = \begin{bmatrix} S_x & 0 & 0 \\ 0 & S_y & 0 \\ 0 & 0 & S_z \end{bmatrix} \quad \text{Eq. (63)}$$

with $S_x = S_y = S_z = 1$ nominally. Matrix M in Eq. (1) describes any misalignment of the x-axis and the y-axes with respect to the tool axis and is given by $$M = \begin{bmatrix} 0 & 0 & \phi_y \\ 0 & 0 & -\phi_x \\ -\phi_y & \phi_x & 0 \end{bmatrix} \quad \text{Eq. (64)}$$

Vector b in Eq. (57) is a bias vector related to the tool bias of the magnetometer and is given as:

$$b = \begin{bmatrix} b_x \\ b_y \\ b_z \end{bmatrix} \qquad \text{Eq. (65)}$$

Some of these error parameters (i.e., scale factor S, misalignment M, bias b, etc.) may be estimated base on the knowledge that magnetic measurements of $B_z$ and $\sqrt{B_x^2+B_y^2}$ are constant values for a magnetometer rotating at a selected depth. Due to unknown tool orientation and rotation angles, the proper values of the constant magnetic measurements $B_z$ and $\sqrt{B_x^2+B_y^2}$ may not be available. However, the EKF method is able to process pseudo-measurements that are a difference between the estimates of the (unknown) constant values of the surrounding magnetic field and corrected radial and axial magnetic field values.

Eq. (62) may be solved for $B^{TF}$ to first order to obtain:

$(S[I+M])^{-1}(B_m^{TF}-b)=(S[I+M])^{-1}(S[I+M])B^{TF}$ $B^{TF}=(S[I+M])^{-1}(B_m^{TF}-\vec{b})$ $B^{TF} \approx [S^{-1}-M]B_m^{TF}-b$ \qquad Eq. (66)

Thus, the true values of the magnetic field $B^{TF}$ may be determined from the measured values $B_m^{TF}$ using Eq. (66). It is apparent that not all error terms in Eq. (66) are simultaneously observable from rotation about the z-axis when the rotation angle and tool orientation are unknown. Additionally, $S_x$ and $S_y$ are not simultaneously observable without knowing the radial field strength. However, an average correction to scale factor may be estimated using a single scale correction variable, S. Applying observable corrections to the measurement magnetic field vector, one obtains:

$$B_{corr}^{TF} = \left( \begin{bmatrix} \frac{1}{S} & 0 & 0 \\ 0 & \frac{1}{2-S} & 0 \\ 0 & 0 & 1 \end{bmatrix} - M \right) \qquad \text{Eq. (67)}$$

$$B_m^{TF} - \begin{bmatrix} b_x \\ b_y \\ 0 \end{bmatrix} = \begin{bmatrix} \frac{1}{S}B_{m_x} - \phi_y B_{m_z} - b_x \\ \frac{1}{2-S}B_{m_y} - \phi_x B_{m_z} - b_y \\ B_{m_z} + \phi_y B_{m_x} - \phi_x B_{m_y} \end{bmatrix} = \begin{bmatrix} B_{corr_x} \\ B_{corr_y} \\ B_{corr_z} \end{bmatrix}$$

Although the correct values of $B_z$ and $\sqrt{B_x^2+B_y^2}$ are considered to be unknown due to the unknown orientation of the tool, these values are constant during the rotation about the z-axis. Thus, these correct values may be processed in an Extended Kalman Filter (EKF) to determine the various observable bias, scale and misalignment values. The measurements are formulated based on the components of Eq. (7) as follows:

$$z_1 = h_1(x) + v_1 = C_{xy} - \qquad \text{Eq. (68)}$$

$$\left[ \left( \frac{1}{S}B_{m_x} - \phi_y B_{m_z} - b_x \right)^2 + \left( \frac{1}{2-S}B_{m_y} - \phi_x B_{m_z} - b_y \right)^2 \right]^{1/2} +$$

$v_1$ and $$z_2=h_2(x)+v_2=C_z-(B_{m_z}+\phi_y B_{m_x}-\phi_x B_{m_y})+v_2 \qquad \text{Eq. (69)}$$

where x is a state vector given by:

$$x = \begin{bmatrix} C_{xy} \\ C_z \\ b_x \\ b_y \\ S \\ \phi_x \\ \phi_y \end{bmatrix} \qquad \text{Eq. (70)}$$

and $C_{xy}$ and $C_z$ are unknown constants representing the actual values of the radial and axial magnetic fields, respectively. Eqs. (68) and (69) are pseudo-measurements, in that they are contrived, and not actually measured. The pseudo-measurement values (Eqs. (68) and (69)) input to the EKF are zero-valued, indicating that $$C_{xy} = \qquad \text{Eq. (71)}$$

$$\left[ \left( \frac{1}{S}B_{m_x} - \phi_y B_{m_z} - b_x \right)^2 + \left( \frac{1}{2-S}B_{m_y} - \phi_x B_{m_z} - b_y \right)^2 \right]^{1/2} - v_1$$

and $$C_z=(B_{m_z}+\phi_y B_{m_x}-\phi_x B_{m_y})-v_2 \qquad \text{Eq. (72)}$$

Partial derivatives obtained from Eq. (68) are given in the following equations:

$$\frac{\partial h_1}{\partial C_{xy}} = 1 \qquad \text{Eqs. (73)}$$

$$\frac{\partial h_1}{\partial b_x} = \frac{B_{corr_x}}{B_{xy}}$$

$$\frac{\partial h_1}{\partial b_y} = \frac{B_{corr_y}}{B_{xy}}$$

$$\frac{\partial h_1}{\partial S} = \frac{1}{B_{xy}} \left( B_{corr_x} \frac{B_{m_x}}{S^2} - B_{corr_y} \frac{B_{m_y}}{(2-S)^2} \right)$$

$$\frac{\partial h_1}{\partial \phi_x} = -\frac{1}{B_{xy}} B_{corr_y} B_{m_z}$$

$$\frac{\partial h_1}{\partial \phi_y} = \frac{1}{B_{xy}} B_{corr_x} B_{m_z}$$

Partial derivatives obtained from Eq. (69) are given by the following equations.

$$\frac{\partial h_2}{\partial C_x} = 1 \qquad \text{Eqs. (74)}$$

$$\frac{\partial h_2}{\partial \phi_x} = B_{m_y}$$

$$\frac{\partial h_2}{\partial \phi_y} = -B_{m_x}$$

where $$B_{xy} = [B_{corr_x}^2 + B_{corr_y}^2]^{1/2} \qquad \text{Eq. (75)}$$

Partial derivatives not given in the equations (73) and (74) are generally zero. The partial derivative vector of each measurement may be used in the EKF formulation and are given by $$H_1 = \frac{\partial h_1}{x} = \left[ \frac{\partial h_1}{\partial C_{xy}} \ 0 \ \frac{\partial h_1}{\partial b_x} \ \frac{\partial h_1}{\partial b_y} \ \frac{\partial h_1}{\partial S} \ \frac{\partial h_1}{\partial \phi_x} \ \frac{\partial h_1}{\partial \phi_y} \right] \qquad \text{Eq. (76)}$$

$$H_2 = \frac{\partial h_2}{x} = \left[ 0 \ \frac{\partial h_2}{\partial C_x} \ 0 \ 0 \ 0 \ \frac{\partial h_2}{\partial \phi_x} \ \frac{\partial h_2}{\partial \phi_y} \right] \qquad \text{Eq. (77)}$$

Methods for performing the EKF to determine a tool bias are discussed below. In the EKF, $x_k$ represents a true value at time $t_k$ of the state vector containing the parameters to be estimated. Furthermore, $\hat{x}_k^-$ represents an estimate of the state vector at time $t_k$ based on measurements obtained up to time $t_{k-1}$, and $\hat{x}_k^+$ represents an estimate of the state vector at time $t_k$ based on all measurements obtained up to time $t_k$. Also, $P_k$ represents a state error covariance matrix. A nonlinear measurement therefore has the form $$z_k = h(t_k, x_k) + v_k \qquad \text{Eq. (78)}$$

where $h(t_k, x_k)$ is a function of the state and $v_k$ is noise that is uncorrelated from one measurement to the next. Linearizing about the latest estimate of the state vector yields the following equation:

$$z_k = h(t_k, \hat{x}_k^-) + H\Delta x_x + \ldots + v_k \qquad \text{Eq. (79)}$$

in which $$H = \frac{\partial h}{\partial x}\bigg|_{\hat{x}_k^-} \qquad \text{Eq. (80)}$$

is the measurement partial derivative matrix evaluated at the latest measurement, and $$\Delta x_x = x_k - \hat{x}_k^- \qquad \text{Eq. (81)}$$

Rearranging Eq. (79) and obtaining an expectation of the truncated first-order expansion yields the measurement residual $$y_k = z_k - \widehat{h(t_k, x_k)}^- + \hat{v}_k^- \approx z_k - h(t_k, \hat{x}_k^-) \qquad \text{Eq. (82)}$$

Updating the EKF measurements includes the information from the latest measurements into the state vector estimate. Updating the EKF is performed using:

$$K = P_k^- H^T [HP_k^- H^T + R_k]^{-1}$$

$$\hat{x}_k^+ = \hat{x}_k^- + K y_k$$

$$P_k^+ = (I - KH) P_k^- \qquad \text{Eqs. (83)}$$

where $$R_k = E[v_k^2] \qquad \text{Eq. (84)}$$

Figure 3:
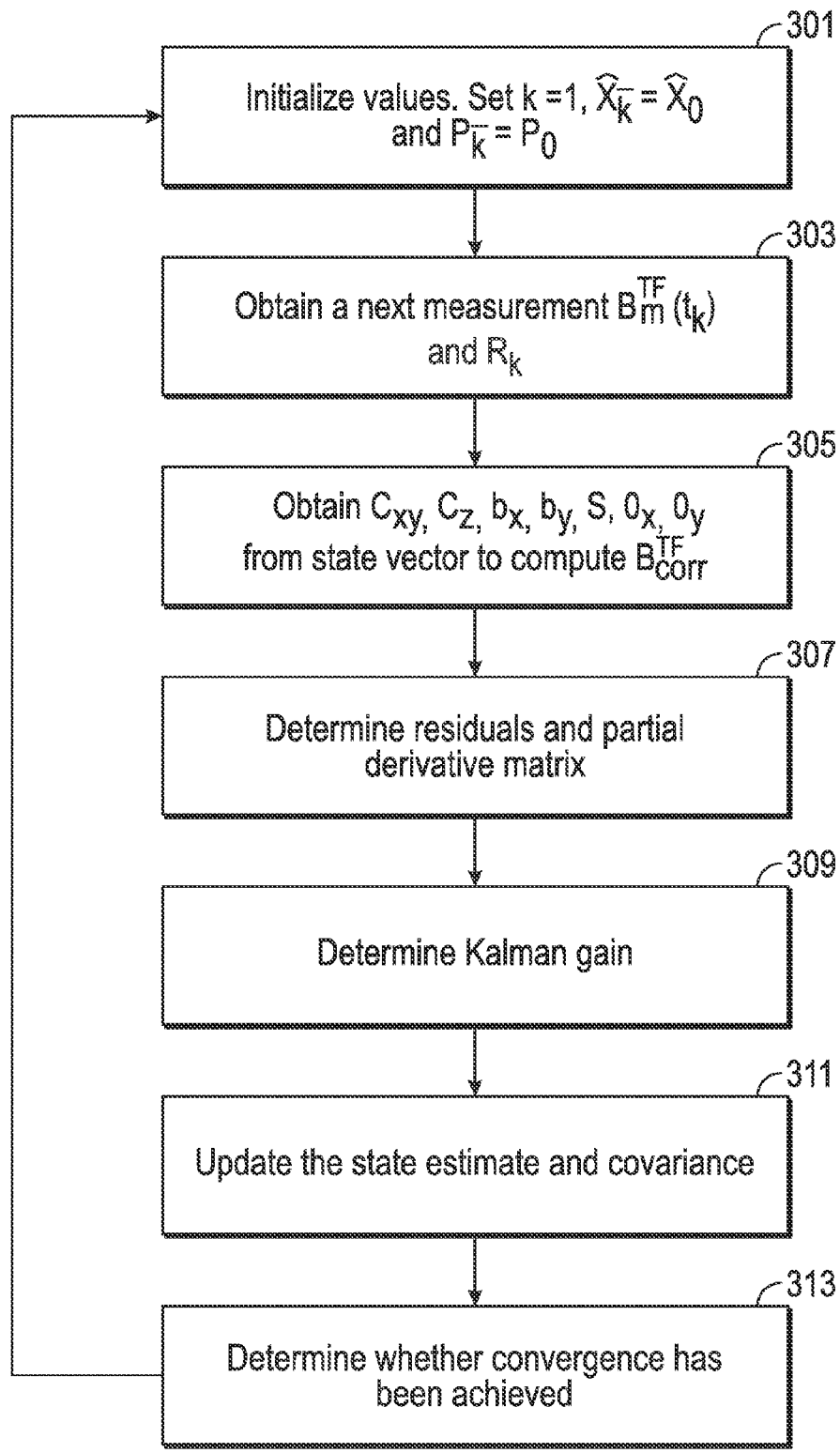
FIG. 3 illustrates the orthogonal sensor axes for the accelerometers and magnetometers a section of the logging string that includes the magnetometer and the accelerometer.

FIG. 3 shows a flowchart 300 illustrating a method of reducing a measurement bias by performing an Extended Kalman Filter in one embodiment of the present disclosure. In box 301, the filtering process is initialized. Index k is set to k=1 and initial values are set for $\hat{x}_k^- = \hat{x}_0$ and $P_k^- = P_0$. In box 303, subsequent observations are made for the magnetic field $B_m^{TF}(t_k)$ and a noise covariance matrix. In box 305 variables from the state vector $\hat{x}_k^-$ are used to compute the corrected magnetic field values $B_{Corr}^{TF}$ using, for example, Eq. (67). In box 307, the residuals and partial derivative matrix are determined from Equations (68), (69), (76) and (77). Residuals may be given by:

$$y_k = \begin{bmatrix} 0 \\ 0 \end{bmatrix} - \begin{bmatrix} h_1 \\ h_2 \end{bmatrix} \qquad \text{Eq. (85)}$$

and the partial derivative may given by:

$$H = \begin{bmatrix} H_1 \\ H_2 \end{bmatrix}$$

In box 309, the Kalman gain is determined. The Kalman gain may be determine using a DeVries formulation governed by the equations:

$$T_1 = P_k^- H^T \qquad \text{Eq. (86)}$$

$$T_2 = HT_1 + R_k \qquad \text{Eq. (87)}$$

$$K = T_1 T_2^- \qquad \text{Eq. (88)}$$

In box 311, the state vector estimate and the covariance is determined. The state vector estimate and covariance maybe determined via the De Vries formulation, wherein:

$$\hat{x}_k^+ = \hat{x}_k^- + K y_k \qquad \text{Eq. (89)}$$

$$T_3 = K\left(\frac{1}{2}T_2\right) - T_1 \qquad \text{Eq. (90)}$$

$$T_4 = T_3 K^T \qquad \text{Eq. (91)}$$

$$P_k^+ = P_k^- + T_4 + T_4^T \qquad \text{Eq. (92)}$$

In box 313, it is determined whether the tool bias values have converged. The square root of the diagonal elements of the $P_k^+$ matrix may be compared to a selected convergence threshold to determine convergence. If a square root of the diagonal elements is within the selected convergence threshold, the EKF is considered to have converged. If convergence has not been achieved, the EKF method returns to box 303 with the vectors updated, such that:

$$k = k+1 \qquad \text{Eq. (93)}$$

$$\hat{x}_k^- = \hat{x}_{k+1}^+ \qquad \text{Eq. (94)}$$

$$P_k^- = P_{k-1}^+ \qquad \text{Eq. (95)}$$

Figure 4:
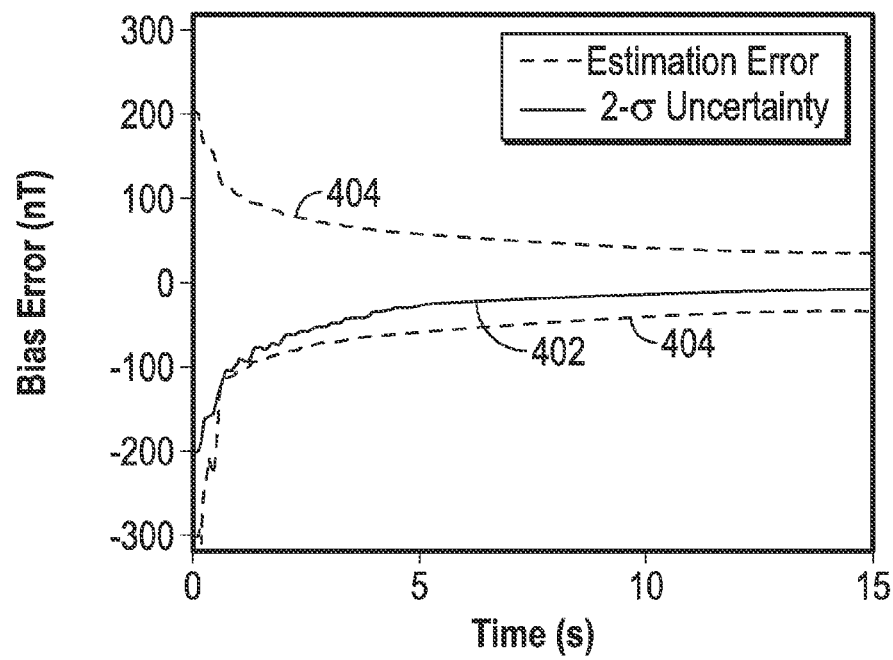
FIG. 4 shows a flowchart illustrating a method of reducing a measurement bias by performing an Extended Kalman Filter in one embodiment of the present disclosure.

FIG. 4 shows an x-axis magnetometer bias determination obtained using the Extended Kalman Filter method of the present disclosure. Time is shown along the abscissa in seconds and bias error is shown along the ordinate in nanoTesla. The bias error is determined using about 30 samples (magnetometer readings) per second with a magnetometer that is rotating at about 90 revolutions per minute. It can be seen that within about 5 seconds, the bias error (residual measurement error) 402 has been reduced to within a 2-sigma uncertainty level of about 25 nT (404) using the Extended Kalman Filter methods disclosed herein.

Figure 5:
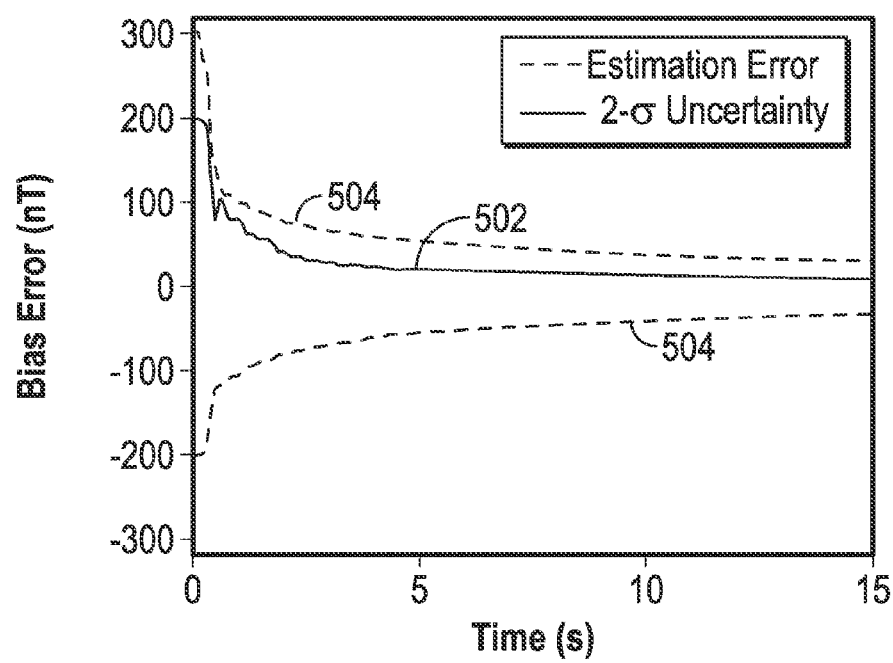
FIG. 5 shows an x-axis magnetometer bias determination obtained using the Extended Kalman Filter method of the present disclosure.

FIG. 5 shows a y-axis magnetometer bias determination obtained using the Extended Kalman Filter and the magnetometer measurement data used with respect to the corresponding x-axis magnetometer bias determination shown in FIG. 4. Time is shown along the abscissa in seconds and bias error is shown along the ordinate in nanoTesla. Similar with FIG. 4, it can be seen that within about 5 seconds, the bias error (residual measurement error) 502 has been reduced to within a 2-sigma uncertainty level of about 25 nT (504) using the Extended Kalman Filter methods discloses herein.

Figure 6:
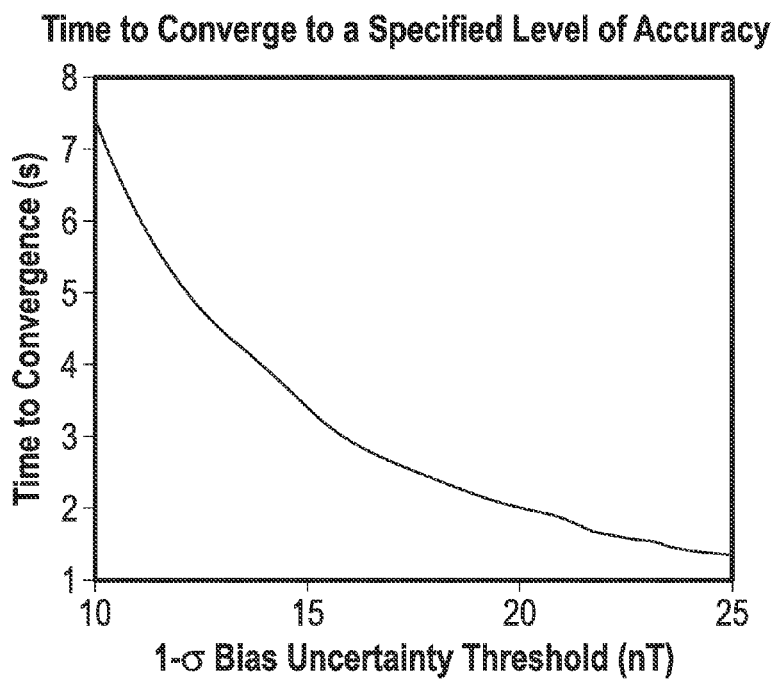
FIG. 6 shows a y-axis magnetometer bias determination obtained using the Extended Kalman Filter and the magnetometer measurement data used with respect to the corresponding x-axis magnetometer bias determination shown in FIG. 4.

FIG. 6 shows a time to convergence for obtaining various levels of accuracy of the bias correction using the Extended Kalman Filter method disclosed herein. For example, in order to obtain a bias correction that is within a single-sigma bias uncertainty threshold of 25 nanoTesla, the Extended Kalman Filter may be run for about 1.5 seconds. In order to obtain a bias correction that is within a single-sigma bias uncertainty threshold of 15 nanoTesla, the Extended Kalman Filter may be run for about 3.5 seconds. Determining the bias correction to less than about 10 nanoTesla includes running the Extended Kalman Filter for about 7.5 seconds.

Systemic Sensor Error Correction for Sensor Biases and Magnetic Interference

Accelerometer Error Corrections

For a slowly rotating system, a Jacobian method such as described in Eqs. (37)-(41) may be used. Using Eq. (41) where H represents a gravitational acceleration variable:

$$\frac{\partial}{\partial a}[(G - \Psi(a))^T (G - \Psi(a))] = 0 \qquad \text{Eq. (96)}$$

The equation for $\Psi(a)$ given by Eq. (38) may be differentiated to obtain:

$$\delta = \tan^{-1}\left(\frac{\sqrt{a_x^2 + a_y^2}}{a_z}\right) \qquad \text{Eq. (97)}$$

$$\psi = \tan^{-1}\left(\frac{-a_x}{-a_y}\right) \qquad \text{Eq. (98)}$$

The Jacobian may then be determined to be:

$$J_{i,j,x} = \qquad \text{Eq. (99a)}$$

$$\begin{bmatrix} 1 + G_e\left(\sin\psi_i \sin\delta_i \dfrac{a_y}{a_x^2 + a_y^2} - \cos\psi_i \cos\delta_i \dfrac{a_x a_z}{A^2 \sqrt{a_x^2 + a_y^2}}\right) \\ G_e\left(\cos\psi_i \sin\delta_i \dfrac{a_y}{a_x^2 + a_y^2} + \sin\psi_i \cos\delta_i \dfrac{a_x a_z}{A^2 \sqrt{a_x^2 + a_y^2}}\right) \\ -G_e \sin\delta_i \dfrac{a_x a_z}{A^2 \sqrt{a_x^2 + a_y^2}} \end{bmatrix}^T$$

$$J_{i,j,y} = \qquad \text{Eq. (99b)}$$

$$\begin{bmatrix} G_e\left(-\sin\psi_i \sin\delta_i \dfrac{a_x}{a_x^2 + a_y^2} - \cos\psi_i \cos\delta_i \dfrac{a_y a_z}{A^2 \sqrt{a_x^2 + a_y^2}}\right) \\ 1 + G_e\left(-\cos\psi_i \sin\delta_i \dfrac{a_x}{a_x^2 + a_y^2} + \sin\psi_i \cos\delta_i \dfrac{a_y a_z}{A^2 \sqrt{a_x^2 + a_y^2}}\right) \\ -G_e \sin\delta_i \dfrac{a_y a_z}{A^2 \sqrt{a_x^2 + a_y^2}} \end{bmatrix}^T$$

$$J_{i,j,z} = \begin{bmatrix} G_e\left(\cos\psi_i \cos\delta_i \dfrac{\sqrt{a_x^2 + a_y^2}}{A^2}\right) \\ -G_e\left(\sin\psi_i \cos\delta_i \dfrac{\sqrt{a_x^2 + a_y^2}}{A^2}\right) \\ 1 + G_e \sin\delta_i \dfrac{\sqrt{a_x^2 + a_y^2}}{A^2} \end{bmatrix} \qquad \text{Eq. (99c)}$$

And $$A = \sqrt{a_x^2 + a_y^2 + a_z^2} \qquad \text{Eq. (100)}$$

where and the Jacobian is shown as three columns of the 3×3 Jacobian matrix, j is the iteration number, i is the data sample number, the A, $a_x$, $a_y$ and $a_z$ are the corrected acceleration components at iteration j for each data point i, and the relative bearing, $\psi_i$ and the deviation, $\delta_i$, are recomputed using the updated acceleration components at iteration j; that is, the updated accelerations: $a_x = a_{i,x} + a_{j,x}$, $a_y = a_{i,y} + a_{j,y}$ and $a_z = a_{i,z} + a_{j,z}$. And the $a_j$ are the current bias vector solution.

Magnetometer Error Corrections

For a slowly rotating system, a Jacobian method such as described in Eqs. (37)-(41) may be used. Using Eq. (41) where H represents a magnetic measurement variable $$\frac{\partial}{\partial a}[(B - \Psi(b))^T (B - \Psi(b))] = 0$$

The Jacobian may be solve using the equation for $\Psi(b)$ given by Eq. (40) to obtain $$J_{i,k,x} = \qquad \text{Eq. (101a)}$$

$$\begin{bmatrix} 1 + B_e \cos\theta \dfrac{A_i A_{i,y} b(b_j) - A_{i,x} A_{i,z} a(b_j)}{\sqrt{(b(b_j)^2 + a(b_j)^2)^3}} (\cos\psi_i \cos\delta_i a(b_j) + \sin\psi_i b(b_j)) \\ B_e \cos\theta \dfrac{A_i A_{i,x} b(b_j) - A_{i,y} A_{i,z} a(b_j)}{\sqrt{(b(b_j)^2 + a(b_j)^2)^3}} ((\cos\psi_i \cos\delta_i a(b_j) + \sin\psi_i b(b_j))) \\ B_e \cos\theta \dfrac{(A_{i,x}^2 + A_{i,y}^2) a(b_j)}{\sqrt{(b(b_j)^2 + a(b_j)^2)^3}} ((\cos\psi_i \cos\delta_i a(b_j) + \sin\psi_i b(b_j))) \end{bmatrix}^T$$

-continued $$J_{i,k,y} = \begin{bmatrix} B_e\cos\theta\frac{A_iA_{i,y}b(b_j)-A_{i,x}A_{i,z}a(b_j)}{\sqrt{(b(b_j)^2+a(b_j)^2)^3}}(\sin\psi_i\cos\delta_i a(b_j)+ \\ \cos\psi_i b(b_j)) \\ 1+B_e\cos\theta\frac{A_iA_{i,x}b(b_j)-A_{i,y}A_{i,z}a(b_j)}{\sqrt{(b(b_j)^2+a(b_j)^2)^3}}((\sin\psi_i\cos\delta_i a(b_j)+ \\ \cos\psi_i b(b_j))) \\ B_e\cos\theta\frac{(A_{i,x}^2+A_{i,y}^2)a(b_j)}{\sqrt{(b(b_j)^2+a(b_j)^2)^3}}((\sin\psi_i\cos\delta_i a(b_j)+ \\ \cos\psi_i b(b_j))) \end{bmatrix}^T$$

Eq. (101b)

$$J_{i,k,z} = \begin{bmatrix} B_e\cos\theta\frac{A_iA_{i,y}b(b_j)-A_{i,x}A_{i,z}a(b_j)}{\sqrt{(b(b_j)^2+a(b_j)^2)^3}}(\sin\delta_i a(b_j)) \\ B_e\cos\theta\frac{A_iA_{i,x}b(b_j)-A_{i,y}A_{i,z}a(b_j)}{\sqrt{(b(b_j)^2+a(b_j)^2)^3}}(\sin\delta_i a(b_j)) \\ 1-B_e\cos\theta\frac{(A_{i,x}^2+A_{i,y}^2)a(b_j)}{\sqrt{(b(b_j)^2+a(b_j)^2)^3}}(\sin\delta_i a(b_j)) \end{bmatrix}^T$$

Eq. (101c)

where j is the iteration number, and i is the data sample number, a(b) and b(b) are the numerator and denominator of the argument of the arc tangent in the equation for the drift azimuth and $$a(b)=A\{A_x(M_y-b_y)-A_y(M_x-b_x)]$$

$$b(b)=A_z[A_x-(M_x-b_x)+A_y(M_y-b_y)]-(M_z-b_z)\cdot(A_x^2+A_y^2)]$$

and the Jacobian is shown as three columns of the 3×3 Jacobian matrix. Defining following temporary variables will simplify the magnetic field Jacobian matrix:

$\alpha_i=\cos\psi_i\cos\delta_i\cos\theta$ $\beta_i=-\cos\psi_i\sin\delta_i\sin\theta$ $\gamma_i=-\sin\psi_i\cos\theta$ $\epsilon_i=\sin\psi_i\cos\delta_i\cos\theta$ $\omega_i=-\sin\psi_i\sin\delta_i\sin\theta$ $\xi_i=\cos\delta_i\cos\theta$ $\tau_i=\sin\delta_i\cos\theta$ $\chi_i=\cos\delta_i\cos\theta$ $$G_{i,j,x}=\frac{A_iA_{i,y}b(b_j)-A_{i,x}A_{i,z}a(b_j)}{\sqrt{(b(b_j)^2+a(b_j)^2)^3}}$$

$$G_{i,j,x}=\frac{A_iA_{i,y}b(b_j)-A_{i,x}A_{i,z}a(b_j)}{\sqrt{(b(b_j)^2+a(b_j)^2)^3}}$$

$$G_{i,j,x}=-\frac{[A_{i,x}^2+A_{i,y}^2]a(b_j)}{\sqrt{(b(b_j)^2+a(b_j)^2)^3}}$$

And substituting into the Jacobian $$J_{i,j,x} = \begin{bmatrix} 1+B_e G_{i,j,x}(\alpha_i a(b_j)-\gamma_i b(b_j)) \\ -B_e G_{i,j,y}(\alpha_i a(b_j)-\gamma_i b(b_j)) \\ -B_e G_{i,j,z}(\alpha_i a(b_j)-\gamma_i b(b_j)) \end{bmatrix}^T$$

$$J_{i,j,y} = \begin{bmatrix} B_e G_{i,j,x}(\epsilon_i a(b_j)-\xi_i b(b_j)) \\ 1+B_e G_{i,j,y}(\epsilon_i a(b_j)-\xi_i b(b_j)) \\ B_e G_{i,j,z}(\epsilon_i a(b_j)-\xi_i b(b_j)) \end{bmatrix}^T$$

$$J_{i,j,z} = \begin{bmatrix} B_e G_{i,j,x}\tau_i a(b_j) \\ B_e G_{i,j,y}\tau_i a(b_j) \\ 1-B_e G_{i,j,z}\tau_i a(b_j) \end{bmatrix}^T$$

where i is the data sample number and j is the iteration number. Taking the transpose of the equations gives the final solution for the Jacobian matrix.

$$J_{i,j,x}=B_e(\alpha_i a(b_j)-\gamma_i b(b_j))[G_{i,j,x}-G_{i,j,y}-G_{i,j,z}]+[1\ 0\ 0]$$

$$J_{i,j,y}=B_e(\epsilon_i a(b_j)-\xi_i b(b_j))[G_{i,j,x}G_{i,j,y}G_{i,j,z}]+[0\ 1\ 0]$$

$$J_{i,j,x}=B_e\tau_i a(b_j)[G_{i,j,x}G_{i,j,y}-G_{i,j,z}]+[0\ 0\ 1]$$

These equations produce an N×3 or 3N×1 Jacobian matrix depending on implementation details.

An exemplary method for determining an error is discussed below. The Earth's magnetic field, an inclination of the Earth's magnetic field and an Earth's gravitational field strength are obtained at the test site. These may be obtained either by direct measurement or from a model such as the IGRF and the WGS-84 gravitational field model. The accelerometer data is filtered to precondition the accelerometer data. The magnetometer data is filtered to precondition the magnetometer data. Orientation data is computed using the obtained data. The method for computing orientation data is described below.

An initial guess of the orientation is made. A suitable initial guess may be an orientation parallel to the longitudinal axis of the tool string. Such guess may be given by $$b = \begin{bmatrix} 0 & 0 & (|B|-\sqrt{B\cdot M}) \end{bmatrix}$$

Eq. (102)

or $$b = \begin{bmatrix} 0 & 0 & (\sqrt{B\cdot B-M\cdot M}) \end{bmatrix}$$

Eq. (103)

for example.

A residual vector $\epsilon$ is computed. Using a recursion relation, an updated model vector as shown in Eq. (104) is computed. A matrix inversion may be performed by any of several methods, for example Singular Value Decomposition, LU Decomposition, Gaussian Elimination, etc.

$$\Delta b_m=(J^T\cdot J+\lambda I)^{-1}J^T\cdot\epsilon_m$$

Eq. (104)

The model vector may then be updated via Eq. (105).

$$\vec{b}_m=\vec{b}_m+\vec{\Delta b}_m I$$

Eq. (105)

where $\vec{b}_{m=0}$ is an initial solution estimate. If the magnitude of the update vector $|\epsilon|$ is greater than a convergence tolerance, and an iteration count is less than a preselected maximum, a new residual vector may be selected and Eqs. (104) and (105) repeated. Upon achieving an computed model vector, drift azimuth, magnetic inclination and magnetic field strength may be computed.

The methods disclosed above with respect to Eqs. (104) and (105) are further discussed with respect to two cases.

Case 1 processes the entire data interval and estimates a constant component of the tool string's magnetic field for non-constant tool. This method determines all or most of the tool string magnetization. In Case 1 a largest valid data range is selected and processes over the entire selected interval as a single data set. Case 1 uses only one execution of the basic algorithm.

Case 2 processes very short intervals, $1<t<<L$, where L may be the number of data acquisition points over which an anomaly is observed, after the constant field component correction yields the time or spatially dependent magnetic disturbance. The length of the interval is generally greater than one data point, and may be determined by a log analyst and/or interpreter.

Case 2 selects a processing interval, e.g. 0.1 to 1 ft or longer. Shorter intervals will have higher resolution and higher noise. The interval will be processed according to the basic methods, steps described with respect to Eqs. (101)-(104) and the initial guess for a given interval will be the solution from the previously-determined interval. The intervals may be processed by stepping to an entirely new interval after convergence (or non-convergent exit) or a sliding solution may be developed where the next value is calculated by stepping along the data by one (or more) data points after each solution, producing a continuous, variable output data set. By control of the damping parameter and the convergence tolerance, the noise level in the solution data set can be reduced (hopefully to acceptable levels). The noise level in the solution is ultimately determined by noise sources in the sensor and associated electronics and processing. Analysis techniques such as linear regression of the log of the residual data set will determine the time decay of the tool string magnetization. If the tool magnetization gets reset, each interval between resets will need to be processed separately. At this point the tool string magnetization can be effectively removed. By subtracting the constant and decay elements of the tool string magnetization from the original measurements, only the Earth and borehole magnetic field remain (and, of course, noise). Subtracting the rotated Earth's magnetic field from the corrected measured data produces a magnetic anomaly data set along the borehole trajectory. By performing the inverse rotation used to get the Earth field into tool body coordinates, the magnetic anomaly field can be placed into the Earth's North, East and Down coordinate system.

If the anomalous data set has sufficient resolution and the anomalous field is strong enough (as in volcanic formations), then the paleomagnetic record could be used with the data set to determine the age of the formation.

Figure 11:
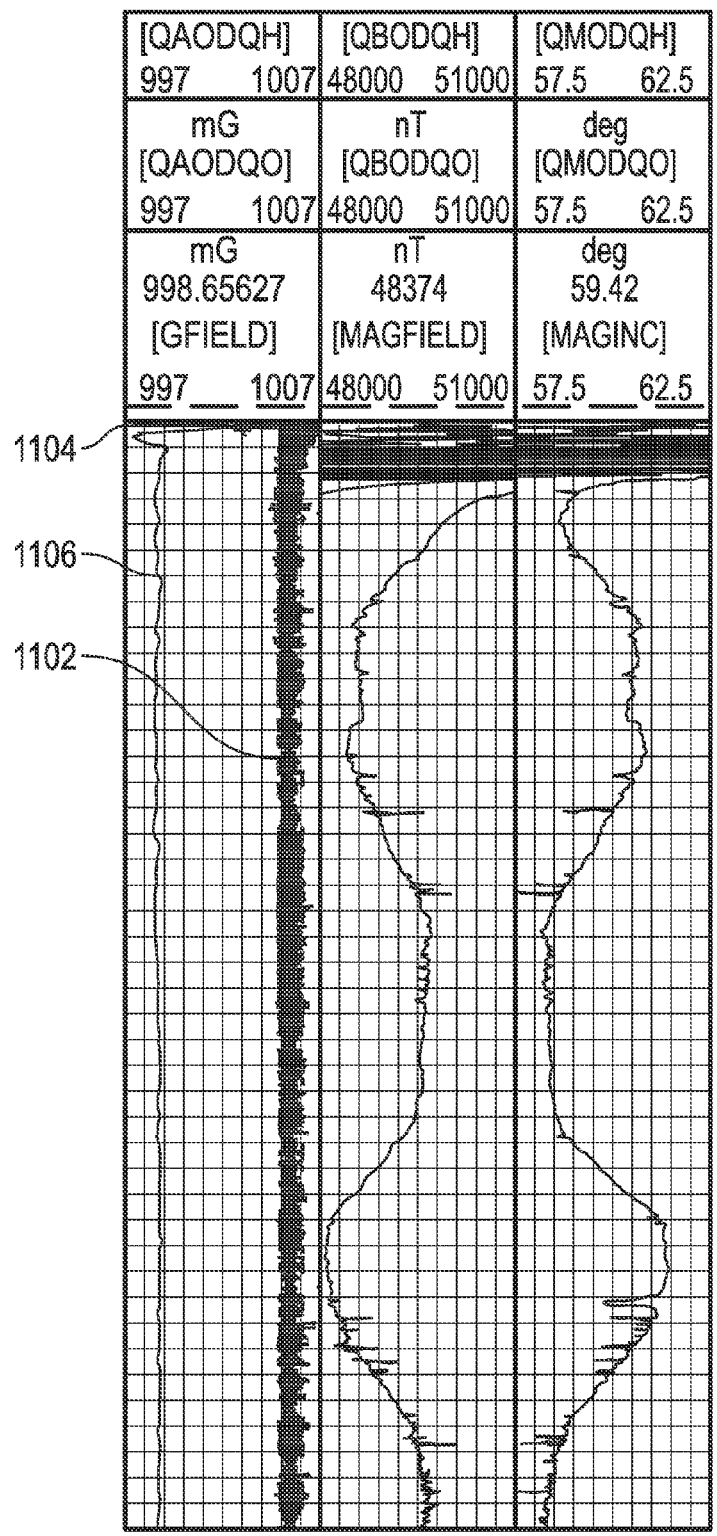
FIG. 11 illustrates the effects of the accelerometer and magnetic bias correction method and anomaly corrections on accelerometer and magnetometer measurements on the computed Earth gravitational and magnetic fields and on the computed magnetic inclination before and after the measurement data corrections shown for all depths in a wellbore log.

FIG. 11 illustrates the effects of the magnetic anomaly extraction method on accelerometer measurements obtained at several depths in a wellbore. The accelerometer measurements are shown in curve 1102. The value of the accelerometer measurements is about 1005.34 mG which is different from the standard value of 998.65 mG, as represented by dotted line 1106. Curve 1104 represented corrected accelerometer measurements using tool bias determined using the magnetic anomaly extraction method disclosed herein.

Figure 12:
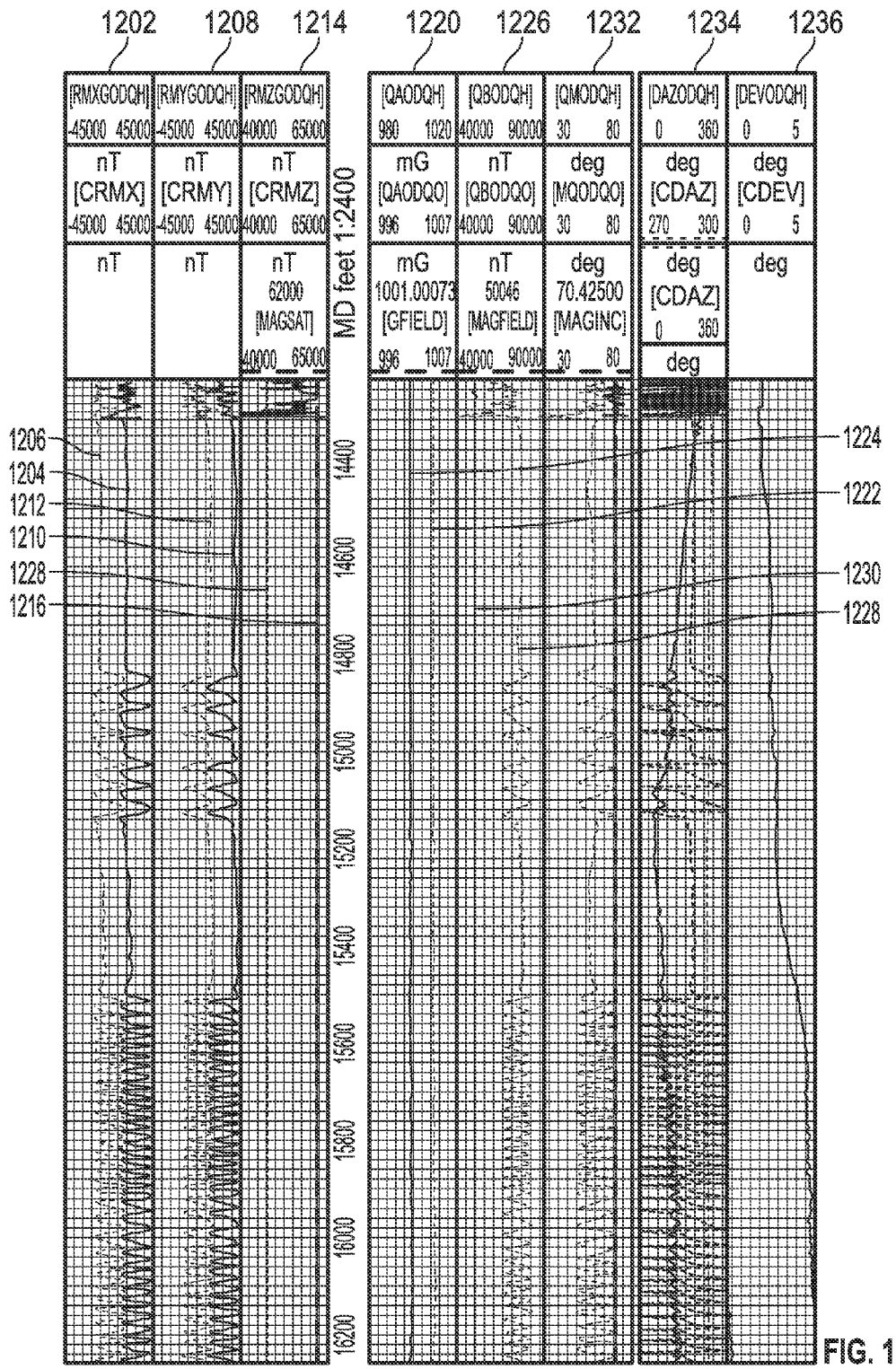
FIG. 12 illustrates the effects of the magnetic bias correction method on magnetometer measurements obtained from a tool string with severe magnetization near the magnetometer sensors before and after correction spanning all depths in a wellbore log.

FIG. 12 shows various parameters obtained using the anomaly extraction method. Logs 1202, 1208 and 1216 show magnetometer measurements. Log 1202 shows measurements ($m_x$) 1204 obtained at the x-oriented magnetometer as well as correct values 1206. Log 1208 shows measurements ($m_y$) 1210 obtained at the y-oriented magnetometer as well as correct values 1212. Log 1214 shows measurements ($m_z$) 1216 obtained at the z-oriented magnetometer as well as correct values 1218. Log 1220 shows measured gravitational field values 1222 and corrected gravitational field values 1224. Log 1226 shows measured total magnetic field values 1228 and corrected total magnetic field values 1230. The corrections to the transformation variables are further shown in logs 1232, 1234 and 1236.

In one embodiment, magnetometer and accelerometer measurements may be obtained during a logging operation or during a wireline tripping operation. Tripping may provide angular rotation of the wireline tool. Thus, the method of magnetic anomaly extraction disclosed herein may be a post-processing method. Once the wireline has been tripped out of the wellbore, tool bias error may be determined over the entirety or substantially the entirety of the logging operation. Processing the entire data interval estimates a constant component of the tool string magnetic field, thereby determining most or all of the tool string magnetization.

In another embodiment, the determined constant field component or tool bias may be applied to a shorter interval in order to determine local or time-dependent magnetic disturbances within the interval.

Tool Bias Correction Using a Min-Max Method

The min-max method employs a method in which a magnetometer tool bias is determined using a reading of the sensors, i.e., magnetometers, as the tool is oriented along one direction, generally a top-side direction, and as the tool is oriented along an opposed direction, generally anti-parallel to the top-side direction. As the magnetometer rotates, the measurement of the constant field of the earth in this formation is measured over a 360 degree angle. During the rotation, the measurement of the formation field passes through a maximum value and a minimum value, and at position 90 degrees before and after these maximum and minimum values, the output is substantially zero. The difference between the absolute value of the maximum and the absolute value of the minimum may be attributed to bias error of the magnetometer. Therefore determining the difference between the maximum value obtained during one revolution of the drill string and the minimum value obtained during the same revolution of the drill string can yield an estimated value which is twice the bias error attributable to the magnetometer.

During revolution of the drill string, magnetometer measurements are obtained at a selected sampling frequency. The sampling should be fast enough to assure that peak magnetometer values can be captured at the maximum anticipated rotation speed. Generally, 200 Hz and 1000 Hz sampling is adequate for typical drilling dynamic motion. Slower sampling may miss the peak values, and result in erroneous dynamic corrections. Each measurement is compared to a current maximum value of the measurement and a current minimum value of the measurement. If the measurement is greater than the current maximum value, then the current maximum value is updated. Similarly, if the measurement is less than the current minimum value, then the current minimum value is updated. Once the drill string has obtained measurements samples over at least 360 degrees of revolution, the difference between the minimum and maximum values may be determined to represent the tool bias of the magnetometer.

During the measurement process, the drill string is susceptible to various drilling dynamics, including stick-slip, which may prevent uniform rotation of the drill string tool over a selected time duration and may even contribute to the drill string rotating in an opposite direction.

In various aspects, the min-max method applies a quality check to the magnetometer measurements that are used in determining the bias correction of the magnetometer. In one embodiment, the min-max method determines when the tool string, and hence the magnetometer, has rotated into a quadrant and records a count of a number of quadrants through which the drill string has rotated. Counting the number of quadrants provides a check to ensure that the magnetometer has rotated a full 360 degrees from a selected starting angle from which calibration measurements have been measured. In one embodiment, the min-max method concludes that measurements have been obtained over a full 360 degrees of revolution when a count of six sequential quadrants is recorded along any selected formation direction (i.e., either a clockwise direction or a counter-clockwise direction). Due to differences between quadrant count and the angle at which a magnetometer measurement is taken, a count of five quadrants count may not ensure that magnetometer measurements have been obtained over a full 360 degree angle. Thus, counting six quadrants ensures that magnetometer measurements have been obtained over a full 360 degree angle.

Entering a new quadrant may be determined by recording a sign of the measurements obtained from the x- and y-directed magnetometer components of the measured magnetic field. As the tool rotates, the signs change in a well-understood sinusoidal manner. A minimum threshold value may be established for the magnetometer measurements in the quadrant transition detection step to eliminate false triggering of this event due to measurement noise. Thus, a quadrant may be counted as the tool passes through the quadrant and obtains measurements from the quadrant in excess of the threshold. The min-max method resets the count of the quadrants when the x- and y-magnetometer reading indicate that the drill string has rotated backwards into a previously-counted quadrant.

Figure 7:
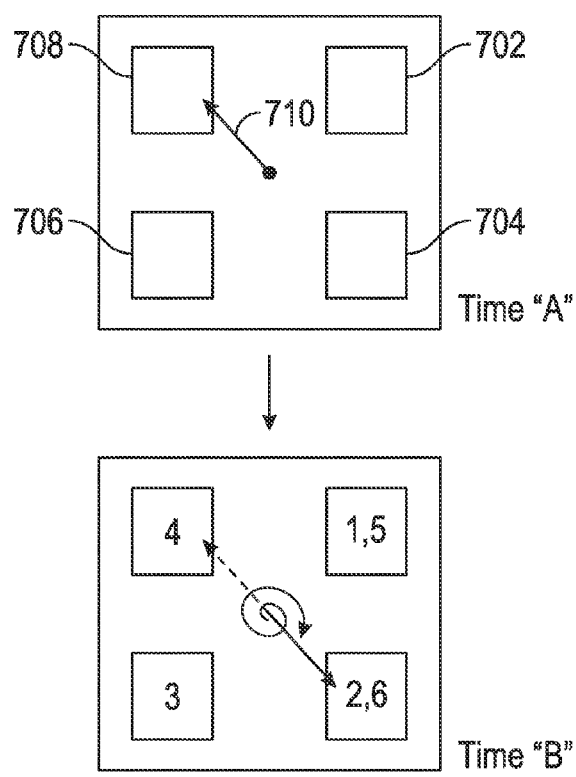
FIG. 7 shows a time to convergence for obtaining various levels of accuracy of the bias correction using the Extended Kalman Filter method disclosed herein.

FIG. 7 shows an exemplary measurement event for calibrating the magnetometer measurements using the min-max method. At time 'A', the tool face 710 is oriented as indicated by arrow 701. Four quadrants (north-east quadrant 702, south-east quadrant 704, south-west quadrant 706 and north-east quadrant 708) indicate the quadrants through which the tool face rotates. At time 'B' (after time 'A'), the tool has rotated through six quadrants in a clock-wise direction. The order in which the tool passed through the quadrants is indicated by the numbering of the quadrants 702, 704, 706 and 708. As can be seen, north-east quadrant 702 is both the first quadrant to be counted as well as the fifth quadrant to be counted. Also, south-east quadrant 704 is both the second and sixth quadrant to be counted. The measurement event is concluded at time 'B' once the sixth quadrant has been counted.

Figure 8:
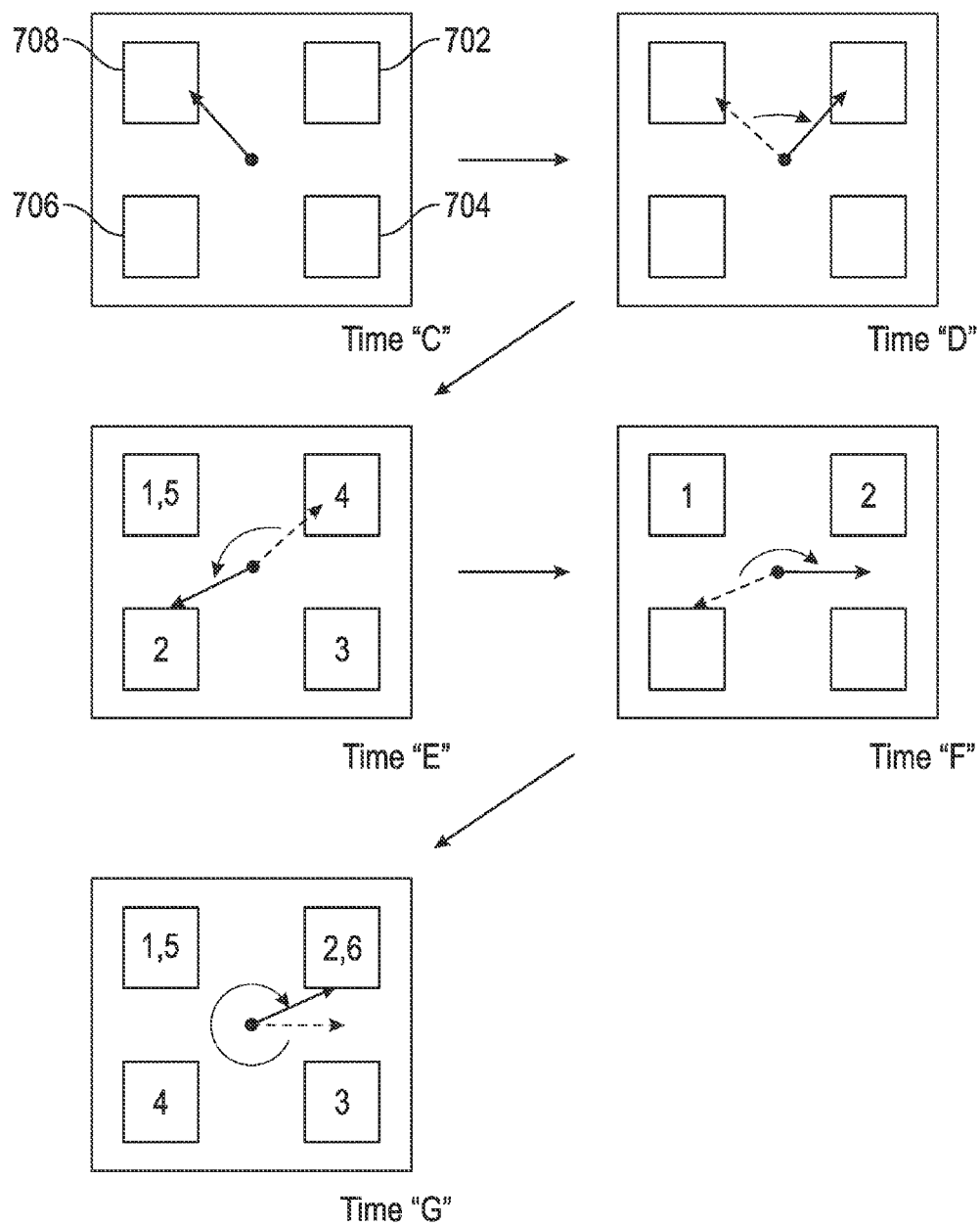
FIG. 8 shows an exemplary measurement event for calibrating the magnetometer measurements using a min-max method of the present disclosure.

FIG. 8 shows an exemplary measurement event that may occur given various difficult down hole conditions and aberrant drill tool behavior. The measurement event begins at time 'C', where the tool face is generally facing toward the north-west quadrant 708 and proceeds sequentially through times 'D', 'E', 'F', 'G' and 'H'. From time 'C' to time 'D', the tool rotates toward the north-east quadrant 702. However the rotation of the tool face is not sufficient for the min-max method to count the north-east quadrant 702. From time 'D' to time 'E', the tool reverses its rotation to a counter-clockwise direction. The tool passes through the north-west quadrant 708 and counts the north-west quadrant 708 as '1'. As the tool rotates counter-clockwise, quadrants 706, 704 and 702 are counted sequentially. Quadrant 708 is counted as the fifth quadrant. At time 'E', the tool face has not rotated far enough to count the south-west quadrant 706 as the sixth quadrant. Also at time 'E', the tool once again reverses direction to rotate in a clock-wise direction. Correspondingly, the min-max method restarts its count of the quadrants. From time 'E' to time 'F', north-west quadrant 508 is counted as '1' and north-east quadrant 502 is counted as '2'. From time 'F' to time 'G', the tool face continues its rotation to complete a count of six sequential quadrants in the clock-wise direction.

In various embodiments, a time period for obtaining a count of six sequential quadrants may be set. Therefore, if six quadrants are not counted within the selected time period, an error message may be sent to an operator and/or the min-max calibration method may be shut down and/or restarted. The intent is to prevent the system from applying bias corrections that may be erroneously determined.

Once six quadrants have been successfully counted, thereby ensuring that measurements have been obtained over an entire revolution of the drill string, the minimum and maximum measurement values obtained over the revolution are examined. As an additional quality verification, the min-max difference is compared to a threshold value to ensure that real rotation has occurred, and not just random noise. The threshold is generally set to a value above the noise level, and is representative of the min-max difference which would be observed on X and Y magnetometers in a minimum real signal situation. An exemplary real signal situation may be, for example, rotating at a tool orientation aligned at least one degree away from the earth's magnetic vector. The verified min-max values may be used to determine a magnetometer tool bias, which may then be used to correct magnetometer measurements.

Therefore, in one aspect, the present disclosure provides a method of correcting measurements obtained by a down hole tool for residual measurement errors, the method including: disposing the tool having at least two directional field sensors in a borehole, wherein the at least two directional sensors are substantially orthogonal to each other and to a longitudinal axis of the down hole tool; obtaining measurements from the at least two directional sensors during rotation of the tool by at least 360 degrees around the longitudinal axis of the tool; determining residual measurement errors for the obtained measurements; selecting a quality level of the determined residual measurement errors; and applying the determined residual measurement errors to the obtained measurements when the determined residual measurement errors are consistent with the selected quality level. In one embodiment, the residual measurement errors may be determined using an Extended Kalman Filter (EKF). The EKF may determine the residual measurement error between an actual value of a down hole magnetic field and the obtained measurements. The residual measurement errors using the EKF method without obtaining knowledge of a total down hole magnetic field. In another embodiment, the measurement errors may be determined by determining a maximum and a minimum of a plurality of magnetometer measurements obtained during a rotation of the at least two direction sensors through the at least 360 degrees about the longitudinal axis. Counting at least six quadrants in a selected rotational direction may determine successful rotation through the at least 360 degrees. In another embodiment, the residual measurement error may be determined by: obtaining magnetometer and accelerometer measurements at the tool; determining a transformation variables using the magnetometer and acclereometer measurements; transforming standard values of at least one of an earth's magnetic field and an earth's gravitational field into a reference frame of the tool using the determined transformation variables; and determining the residual measurement error from a difference between the magnetometer and accelerometer measurements and the transformed standard values of the earth's magnetic field and the earth's gravitational field. Adjusted values of the transformation variables may then be used to transform the standard values of at least one of an earth's magnetic field and an earth's gravitational field into a reference frame of the tool in order to iterate determining the tool bias. In one embodiment, the magnetometer and accelerometer measurements may be obtained at the tool while tripping.

In another aspect, the present disclosure provides a system for drilling a wellbore, the system including: a down hole tool conveyed on a drill string; a magnetometer disposed on down hole tool, the magnetometer including at least magnetometer component sensors that are substantially orthogonal to each other and to a longitudinal axis of the drill string; and a processor configured to: obtain measurements from the at least two directional sensors during rotation of the tool by at least 360 degrees around the longitudinal axis of the tool; determine residual measurement errors for the obtained measurements; select a quality level of the determined residual measurement errors; and apply the determined residual measurement errors to the obtained measurements when the determined residual measurement errors are consistent with the selected quality level. In one embodiment, the processor may further determine the residual measurement errors using an Extended Kalman Filter (EKF). Using the EKF, the processor may determine residual measurement error between an actual value of a down hole magnetic field and the obtained measurements. The processor may determine the residual measurement errors without obtaining knowledge of a total down hole magnetic field. In another embodiment, the processor may determine the measurement errors by determining a maximum and a minimum of a plurality of magnetometer measurements obtained during a rotation of the at least two direction sensors through the at least 360 degrees about the longitudinal axis. The processor may count rotation of the tool through at least six quadrants in a selected direction in order to determine rotation through the at least 360 degrees. In another embodiment, the processor may determine the residual measurement errors by performing the steps of: obtaining magnetometer and accelerometer measurements at the tool; determining a transformation variables using the magnetometer and acclereometer measurements; transforming standard values of at least one of an earth's magnetic field and an earth's gravitational field into a reference frame of the tool using the determined transformation variables; and determining the residual measurement error from a difference between the magnetometer and accelerometer measurements and the transformed standard values of the earth's magnetic field and the earth's gravitational field. The processor may determine adjusted values of the transformation variables and transform the standard values of at least one of an earth's magnetic field and an earth's gravitational field into a reference frame of the tool using the adjusted values of the transformation variables. The processor may further to obtain the magnetometer and accelerometer measurements at the tool while tripping a tool out of a borehole.

In yet another aspect, the present disclosure provides a computer-readable medium having a set of instruction stored therein that are accessible to a processor in order to enable the processor to perform a method, the method including: receiving measurements from at least two directional field sensors in a borehole, wherein the at least two directional sensors are substantially orthogonal to each other and to a longitudinal axis of the down hole tool during rotation of the tool by at least 360 degrees around the longitudinal axis of the tool; determining residual measurement errors for the obtained measurements; selecting a quality level of the determined residual measurement errors; and applying the determined residual measurement errors to the obtained measurements when the determined residual measurement errors are consistent with the selected quality level. In one embodiment, the method further includes determining the residual measurement errors using an Extended Kalman Filter (EKF) applied between an actual value of a down hole magnetic field and the obtained measurements. In another embodiment, the method further includes determining the measurement errors by determining a maximum and a minimum of a plurality of magnetometer measurements obtained during a rotation of the at least two direction sensors through the at least 360 degrees about the longitudinal axis, wherein the determination of the at least 360 degrees further comprises obtaining a count of six quadrants during a rotation of the sensors. In yet another embodiment, the method may further include: obtaining magnetometer and accelerometer measurements at the tool; determining a transformation variables using the magnetometer and accelerometer measurements; transforming standard values of at least one of an earth's magnetic field and an earth's gravitational field into a reference frame of the tool using the determined transformation variables; and determining the residual measurement error from a difference between the magnetometer and accelerometer measurements and the transformed standard values of the earth's magnetic field and the earth's gravitational field.

While the foregoing disclosure is directed to the certain exemplary embodiments of the disclosure, various modifications will be apparent to those skilled in the art. It is intended that all variations within the scope and spirit of the appended claims be embraced by the foregoing disclosure.

The invention claimed is:

1. A method of correcting sensor measurements obtained at a downhole tool, comprising:
    disposing the down hole tool having at least two sets of directional field sensors in a borehole, wherein the at least one of the sets of directional sensors measures the magnetic field and at least one of the sets measures the gravity field, wherein the directional sensors are orthogonal to each other, and one sensor in each set is oriented parallel to the longitudinal axis of the down hole tool;
    obtaining magnetometer and accelerometer measurements at the tool from the at least two sets of field sensors;
    determining a transformation variables using the magnetometer and accelerometer measurements;
    transforming standard values of at least one of an earth's magnetic field and an earth's gravitational field into a reference frame of the tool using the determined transformation variables;
    determining the residual measurement error from a difference between the magnetometer and accelerometer measurements and the transformed standard values of the earth's magnetic field and the earth's gravitational field;
    selecting a quality level of the residual measurement error; and applying the determined residual measurement error to the obtained measurements when the determined calibration correction errors are consistent with the selected quality level.

2. The method of claim 1, further comprising:
obtaining measurements from the at least two directional sensors during rotation of the tool by at least 360 degrees around the longitudinal axis of the tool.

3. The method of claim 2, wherein the residual measurement error is determined using an Extended Kalman Filter (EKF).

4. The method of claim 3, wherein the EKF determines the residual measurement error between an actual value of a down hole magnetic field and the obtained measurements.

5. The method of claim 4, further comprising determining the residual measurement error without obtaining knowledge of a total down hole magnetic field.

6. The method of claim 1, wherein determining the residual measurement error further comprises determining a maximum and a minimum of a plurality of measurements obtained during a rotation of the at least two direction sensors through the at least 360 degrees about the longitudinal axis, wherein the measurements include at least one of magnetometer measurements and accelerometer measurements.

7. The method of claim 6, further comprising rotating the tool through a count of at least six quadrants in a selected direction in order to determine rotation through the at least 360 degrees.

8. The method of claim 1, wherein determining the calibration corrections further comprises:
obtaining the magnetometer and accelerometer measurements at the tool during rotation of the tool by at least 90 degrees around the longitudinal axis of the tool or as the inclination of the tool changes by at least 30 degrees.

9. The method of claim 8, further comprising determining an adjusted value of the transformation variables and transforming the standard values of at least one of an earth's magnetic field and an earth's gravitational field into a reference frame of the tool using the adjusted values of the transformation variables.

10. The method of claim 8, further comprising obtaining the magnetometer and accelerometer measurements at the tool while logging.

11. A system for acquiring magnetometer and accelerometer data, comprising:
a down hole tool conveyed on a member;
at least two orthogonal tri-axial sets of magnetometers and accelerometers disposed on the down hole tool;
a motor for rotating the member;
a processor configured to:
obtain magnetometer and accelerometer measurements from the at least two directional sensors during rotation of the tool by at least 360 degrees around the longitudinal axis of the tool;
determine a transformation variable using the magnetometer and accelerometer measurements;
transform standard values of at least one of an earth's magnetic field and an earth's gravitational field into a reference frame of the tool using the determined transformation variables;
determine a residual measurement error from a difference between the magnetometer and accelerometer measurements and the transformed standard values of the at least one of the earth's magnetic field and the earth's gravitational field;
select a quality level of the determined residual measurement errors; and
apply the residual measurement error to the obtained measurements when the residual measurement is consistent with the selected quality level.

12. The system of claim 11, wherein processor is further configured to determine residual measurement errors on all three axes of each tri-axial set using an Extended Kalman Filter (EKF).

13. The system of claim 12, wherein residual measurement error is between an actual value of a down hole Earth's field and the obtained measurements.

14. The system of claim 11, wherein the processor is further configured to determine adjusted values of the transformation variables, and transform the standard values of at least one of an earth's magnetic field and an earth's gravitational field into a reference frame of the tool using the adjusted values of the transformation variables.

15. The system of claim 14, wherein the processor is further configured to obtain the magnetometer and accelerometer measurements at the tool while tripping.

16. A system for acquiring data downhole, comprising:
a downhole tool conveyed on a rotating member;
a magnetometer disposed on the downhole tool, the magnetometer including at least two directional sensors that are substantially orthogonal to each other and to a longitudinal axis of the member; and
a processor configured to:
obtain measurements from the at least two directional sensors during rotation of the tool by at least 360 degrees around the longitudinal axis of the tool;
determine a transformation variable using the magnetometer and accelerometer measurements;
transform standard values of at least one of an earth's magnetic field and an earth's gravitational field into a reference frame of the tool using the determined transformation variables; and
determine a residual measurement error from a difference between the magnetometer and accelerometer measurements and the transformed standard values of the at least one of the earth's magnetic field and the earth's gravitational field;
select a quality level of the determined residual measurement error; and
apply the determined residual measurement error to the obtained measurements when the determined residual measurement error are consistent with the selected quality level.

17. The system of claim 16, wherein processor is further configured to determine the residual measurement error using an Extended Kalman Filter (EKF).

18. The system of claim 17, wherein the residual measurement error is between an actual value of a down hole magnetic field and the obtained measurements.

19. The system of claim 18, wherein the processor is further configured to determine the residual measurement error without obtaining knowledge of a total down hole magnetic field.

20. The system of claim 19, wherein the processor is further configured to determine the residual measurement error by determining a maximum and a minimum of a plurality of measurements obtained during a rotation of the at least two direction sensors through the at least 360 degrees about the longitudinal axis, wherein the measurements include at least one of magnetometer measurements and accelerometer measurements.

21. The system of claim 16, wherein the processor is further configured to count rotation of the tool through at least six quadrants in a selected direction in order to determine rotation through the at least 360 degrees.

22. The computer-readable medium of claim 21, wherein the method further comprises determining the residual measurement error using an Extended Kalman Filter (EKF) applied between an actual value of a down hole magnetic field and the obtained measurements.

23. The computer-readable medium of claim 21, wherein the method further comprises to determine the residual measurement error by determining a maximum and a minimum of a plurality of measurements obtained during a rotation of the at least two direction sensors through the at least 360 degrees about the longitudinal axis, wherein the determination of the at least 360 degrees further comprises obtaining a count of six quadrants during a rotation of the sensors, wherein the measurements include at least one of magnetometer measurements and accelerometer measurements.

24. A computer-readable medium having a set of instruction stored therein that are accessible to a processor in order to enable the processor to perform a method, the method comprising:

receiving measurements from at least two directional field sensors in a borehole, wherein the at least two directional sensors are substantially orthogonal to each other and to a longitudinal axis of the down hole tool during rotation of the tool by at least 360 degrees around the longitudinal axis of the tool, wherein the at least two directional field sensors include a magnetometer and an accelerometer;

obtaining magnetometer and accelerometer measurements at the tool using the at least two directional field sensors;

determining a transformation variables using the magnetometer and accelerometer measurements;

transforming standard values of at least one of an earth's magnetic field and an earth's gravitational field into a reference frame of the tool using the determined transformation variables;

determining a residual measurement error from a difference between the magnetometer and accelerometer measurements and the transformed standard values of the earth's magnetic field and the earth's gravitational field;

selecting a quality level of the determined residual measurement error; and applying the determined residual measurement error to the obtained measurements when the determined residual measurement error are consistent with the selected quality level.

* * * * *